(12) United States Patent
Tie et al.

(10) Patent No.: US 10,708,098 B2
(45) Date of Patent: Jul. 7, 2020

(54) DATA TRANSMISSION METHOD AND USER EQUIPMENT

(71) Applicant: HUAWEI TECHNOLOGIES CO., LTD., Shenzhen, Guangdong (CN)

(72) Inventors: Xiaolei Tie, Shanghai (CN); Yubo Yang, Shanghai (CN); Gengshi Wu, Shanghai (CN); Yiling Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 16/025,697

(22) Filed: Jul. 2, 2018

(65) Prior Publication Data

US 2018/0316532 A1  Nov. 1, 2018

Related U.S. Application Data

(63) Continuation of application No. PCT/CN2016/076404, filed on Mar. 15, 2016.

(30) Foreign Application Priority Data

Dec. 31, 2015  (WO) ............... PCT/CN2015/100357

(51) Int. Cl.
  *H04L 27/26* (2006.01)
  *H04L 29/06* (2006.01)
  *H04W 72/04* (2009.01)

(52) U.S. Cl.
  CPC .......... *H04L 27/2607* (2013.01); *H04L 27/26* (2013.01); *H04L 27/2602* (2013.01);
  (Continued)

(58) Field of Classification Search
  CPC . H04L 27/26; H04L 27/2602; H04L 27/2605; H04L 29/06; H04L 5/0007;
  (Continued)

(56) References Cited

U.S. PATENT DOCUMENTS

| | | | |
|---|---|---|---|
| 2015/0092756 A1* | 4/2015 | Sorrentino | ........ H04W 56/0045 370/336 |
| 2015/0215979 A1 | 7/2015 | Nan et al. | |

(Continued)

FOREIGN PATENT DOCUMENTS

| | | |
|---|---|---|
| CN | 1913513 A | 2/2007 |
| CN | 101425844 A | 5/2009 |

(Continued)

OTHER PUBLICATIONS

"3GPP TS 36.211 V12.8.0 Dec. (2015), 3rd Generation Partnership Project;Technical Specification Group Radio Access Network;Evolved Universal Terrestrial Radio Access (E-UTRA);Physical channels and modulation(Release 12), 136 pages".

(Continued)

*Primary Examiner* — Mewale A Ambaye
(74) *Attorney, Agent, or Firm* — Leydig, Voit & Mayer, Ltd.

(57) ABSTRACT

A data transmission method in the present application includes: determining, by first UE, a frame structure in a time unit, where the frame structure indicates that N type-1 OFDM symbols and a GP are included in the time unit, and a subcarrier spacing of each type-1 OFDM symbol is $\Delta f_1$. Therefore, according to the data transmission method and the user equipment in embodiments of the present application, a frame structure in a time unit is determined. The frame structure indicates that N type-1 OFDM symbols and a GP are included in the time unit, and a subcarrier spacing of each type-1 OFDM symbol is $\Delta f_1$. Therefore, when an NB-IOT system is deployed in an LTE system in an embedded manner, and when NB-IOT UE is sending data, a channel resource of the legacy LTE system can be adequately utilized, and a conflict with a legacy LTE SRS can be avoided.

18 Claims, 14 Drawing Sheets

---

A first terminal determines a frame structure in a time unit, where the frame structure indicates that N type-1 OFDM symbols and a GP are included in the time unit, a subcarrier spacing of each type-1 OFDM symbol is $\Delta f_1$, a length of the GP is greater than or equal to a time length occupied by one type-2 OFDM symbol, a subcarrier spacing of the type-2 OFDM symbol is $\Delta f_2$, $\Delta f_1$ is unequal to $\Delta f_2$, and N is a positive integer The first terminal sends the type-1 OFDM symbols according to the frame structure

(52) U.S. Cl.
CPC ......... *H04L 29/06* (2013.01); *H04W 72/0453* (2013.01); *H04L 27/2605* (2013.01)

(58) Field of Classification Search
CPC .............. H04L 56/0045; H04L 84/18; H04W 72/0453; H04B 7/2656
See application file for complete search history.

(56) References Cited

U.S. PATENT DOCUMENTS

| | | | |
|---|---|---|---|
| 2015/0373697 | A1 | 12/2015 | Wang et al. |
| 2016/0112172 | A1 | 4/2016 | Seo et al. |
| 2016/0156441 | A1 | 6/2016 | Chae et al. |
| 2016/0156494 | A1* | 6/2016 | Zhao .................... H04B 7/2656 370/476 |
| 2016/0198507 | A1 | 7/2016 | Wu et al. |
| 2016/0286506 | A1* | 9/2016 | Chae .................... H04W 56/002 |
| 2018/0192419 | A1* | 7/2018 | Yi ............................. H04B 7/26 |
| 2019/0165882 | A1* | 5/2019 | You ..................... H04W 72/0453 |
| 2019/0215790 | A1* | 7/2019 | Kim ...................... H04B 7/2656 |
| 2019/0281624 | A1* | 9/2019 | Kim ..................... H04J 13/0062 |
| 2019/0327039 | A1* | 10/2019 | Hwang ................. H04L 5/0048 |

FOREIGN PATENT DOCUMENTS

| | | |
|---|---|---|
| CN | 101431363 A | 5/2009 |
| CN | 101431497 A | 5/2009 |
| CN | 101577857 A | 11/2009 |
| CN | 102811191 A | 12/2012 |
| CN | 103686985 A | 3/2014 |
| CN | 104349421 A | 2/2015 |
| CN | 104521184 A | 4/2015 |
| EP | 2151945 A2 | 2/2010 |
| WO | 2014189424 A1 | 11/2014 |
| WO | 2014209035 A1 | 12/2014 |
| WO | 2015020398 A1 | 2/2015 |
| WO | 2015047144 A1 | 4/2015 |
| WO | 2017039843 A1 | 3/2017 |

OTHER PUBLICATIONS

Intel Corporation:"On Layer 1 design and procedures for NB-IoT downlink", R1-156529, Nov. 15, 2015, XP051002959, 6 pages.
Huawei et al:"Remaining details of uplink frame structure design", 3GPP Draft;R1-160329, vol. RAN WG1, No. St Julian's, Malta, Feb. 14, 2016, XP051053669, 8 pages.
"Some issues related to MBSFN sub-frame structure," RAN WG1 meeting 48bis, Malta, R1-071501, pp. 1-3, NEC Group (Mar. 26-30, 2007).

* cited by examiner

A first terminal determines a frame structure in a time unit, where the frame structure indicates that N type-1 OFDM symbols and a GP are included in the time unit, a subcarrier spacing of each type-1 OFDM symbol is $\Delta f_1$, a length of the GP is greater than or equal to a time length occupied by one type-2 OFDM symbol, a subcarrier spacing of the type-2 OFDM symbol is $\Delta f_2$, $\Delta f_1$ is unequal to $\Delta f_2$, and N is a positive integer The first terminal sends the type-1 OFDM symbols according to the frame structure

FIG. 12

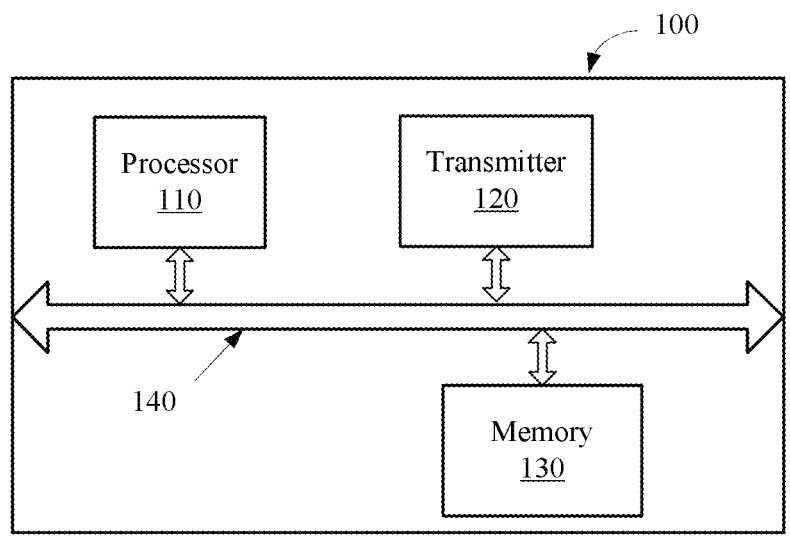

FIG. 13

DATA TRANSMISSION METHOD AND USER EQUIPMENT

CROSS-REFERENCE TO RELATED APPLICATIONS

This application is a continuation of International Application No. PCT/CN2016/076404, filed on Mar. 15, 2016, which claims priority to International Patent Application No. PCT/CN2015/100357, filed on Dec. 31, 2015, the disclosure of which is hereby incorporated by reference in its entirety.

TECHNICAL FIELD

The present application relates to the communications field, and in particular, to a data transmission method and user equipment in the communications field.

BACKGROUND

Machine type communication (MTC) is also referred to as machine-to-machine communication (M2M) or Internet of Things (IOT), and will become an important application in the communications field in the future. Future Internet of Things communication may cover fields such as smart metering, medical inspection and monitoring, logistics inspection, industrial inspection and monitoring, vehicle networking, smart community, and wearable device communication.

A typical cellular Internet of Things system is narrowband IOT (NB-IOT). An uplink system bandwidth and a downlink system bandwidth of the NB-IOT are generally 200 kHz, an operating bandwidth is 180 kHz, and each guard bandwidth on both sides is 10 kHz. An orthogonal frequency division multiplexing (OFDM) technology is used for downlink NB-IOT, and twelve subcarriers with a bandwidth of 15 kHz are multiplexed in a frequency domain. A single carrier frequency division multiple access (SC-FDMA) technology is used for uplink NB-IOT. SC-FDMA transmission is first performing DFT processing on a time-domain signal, mapping a processed signal onto a subcarrier of a corresponding frequency resource, and then modulating the signal in an OFDM modulation manner and sending a modulated signal. By means of such processing, a peak to average power ratio (PAPR) of a signal of SC-FDMA transmission is lower, which better helps implement a radio frequency component on user equipment (UE) such as a mobile phone.

The uplink NB-IOT can support two subcarrier spacings of 3.75 kHz and 15 kHz. When the subcarrier spacing of 3.75 kHz is used, UE supports only single-tone transmission (single-tone transmission), that is, a bandwidth of a time-domain signal of the UE is not greater than 3.75 kHz, and after DFT conversion, only one subcarrier with a subcarrier spacing of 3.75 kHz and in the OFDM modulation manner is occupied. When the subcarrier spacing of 15 kHz is used, UE may support both single-tone transmission (single-tone transmission) and multi-tone transmission (multi-tone transmission).

When uplink transmit power of UE is limited, a signal bandwidth of a subcarrier with a subcarrier spacing of 3.75 kHz is only ¼ of a bandwidth of a subcarrier with a subcarrier spacing of 15 kHz. Therefore, a power spectral density of a transmitted signal of the subcarrier with a subcarrier spacing of 3.75 kHz is four times that of the subcarrier with a subcarrier spacing of 15 kHz, and better anti-interference and anti-path loss performance are gained. Therefore, the subcarrier with a subcarrier spacing of 3.75 kHz is more applicable to UE with poor coverage, for example, UE on a cell edge and even in a basement.

When a 3.75 kHz uplink subcarrier is embedded and deployed in a bandwidth resource of legacy Long Term Evolution (LTE), the following problems exist. On one hand, after transmission with an uplink subcarrier spacing of 3.75 kHz is introduced, a suitable time unit needs to be defined to define a physical resource block. Generally, the time unit is referred to as a subframe. A subframe time length and a subframe structure need to be defined to make transmission efficiency of the NB-IOT as high as possible. That is, as many uplink OFDM symbols as possible are transmitted in each subframe time length.

On the other hand, mutual impact between 3.75 kHz uplink deployment and legacy LTE needs to be minimized. For example, an uplink channel sounding reference signal (SRS) of UE in legacy LTE cannot be affected. In addition, because coverage of an NB-IoT user that uses uplink 3.75 kHz is generally poor, interference from a channel sounding reference signal of legacy LTE may cause relatively large impact on SC-FDMA transmission of uplink 3.75 kHz, which should be avoided. In legacy LTE, a base station may configure a piece of information srs-SubframeConfig in cell-level system broadcast information, where the information indicates a subframe pattern (subframe Pattern) in which an SRS can be sent, and UE in the cell may send an SRS in only subframes indicated by the SRS subframe pattern. In legacy LTE, because UE may send an SRS on only the last OFDM symbol of the indicated subframes, when a frame structure of the NB-IOT is being designed, such a factor may be considered, to avoid mutual interference between an OFDM symbol that is sent by an NB-IOT terminal and that has an uplink subcarrier spacing of 3.75 kHz and an SRS that may be sent by a legacy LTE terminal.

Therefore, the foregoing two factors need to be considered for a 3.75 kHz uplink frame structure in the NB-IOT.

SUMMARY

Embodiments of the present application provide a data transmission method, a subframe structure, and an apparatus, so that when an NB-IOT system is deployed in an LTE system in an embedded manner, and when an NB-IOT terminal is sending data, a channel resource of the legacy LTE system can be adequately utilized, and a conflict with a legacy LTE SRS can be avoided.

According to a first aspect, an embodiment of the present application provides a data transmission method, where the method includes:

determining, by a first terminal, a frame structure in a time unit, where the frame structure indicates that N type-1 OFDM symbols and a guard period (GP) are included in the time unit, a subcarrier spacing of each type-1 OFDM symbol is $\Delta f_1$, a time length of the GP is greater than or equal to a time length occupied by one type-2 OFDM symbol, a subcarrier spacing of the type-2 OFDM symbol is $\Delta f_2$, $\Delta f_1$ is unequal to $\Delta f_2$, and N is a positive integer; and sending, by the first terminal, the type-1 OFDM symbols according to the frame structure.

Therefore, according to the data transmission method in this embodiment of the present application, a first terminal determines a frame structure in a time unit, where the frame structure includes N type-1 orthogonal frequency division multiplexing OFDM symbols and a GP, and a length of the GP is greater than or equal to a time length occupied by one OFDM symbol with a subcarrier spacing of $\Delta f_2$. Therefore, when an NB-IOT system is deployed in an LTE system in an embedded manner, and when an NB-IOT terminal is sending data, a channel resource of the legacy LTE system can be adequately utilized, and a conflict with a legacy LTE SRS can be avoided.

According to a second aspect, an embodiment of the present application provides a frame structure, where the frame structure indicates that N type-1 orthogonal frequency division multiplexing OFDM symbols and a guard period GP are included in a time unit, a subcarrier spacing of each type-1 OFDM symbol is $\Delta f_1$, a time length of the GP is greater than or equal to a time length occupied by one type-2 OFDM symbol, a subcarrier spacing of the type-2 OFDM symbol is $\Delta f_2$, $\Delta f_1$ is unequal to $\Delta f_2$, and N is a positive integer; and the type-1 OFDM symbols are sent according to the frame structure.

Therefore, according to the frame structure in this embodiment of the present application, a frame structure in a time unit is designed, where the frame structure includes N type-1 orthogonal frequency division multiplexing OFDM symbols and a GP, and a length of the GP is greater than or equal to a time length occupied by one OFDM symbol with a subcarrier spacing of $\Delta f_2$. Therefore, when an NB-IOT system is deployed in an LTE system in an embedded manner, and when an NB-IOT terminal is sending data, a channel resource of the legacy LTE system can be adequately utilized, and a conflict with a legacy LTE SRS can be avoided.

Optionally, the GP is used to prevent the sent type-1 OFDM symbols and a type-2 OFDM symbol sent by a second terminal from overlapping on a time-frequency resource.

Optionally, N is a maximum quantity of carried type-1 OFDM symbols in the time unit after the time occupied by one type-2 OFDM symbol is subtracted.

Optionally, both a time length occupied by a cyclic prefix (CP) of the type-1 OFDM symbol and a time length occupied by a CP of the type-2 OFDM symbol are greater than or equal to a preset threshold.

Optionally, if a length of the time unit is 2 millisecond ms, $\Delta f_1=3.75$ kHz, and $\Delta f_2=15$ kHz, the frame structure is a first frame structure, where the first frame structure includes seven type-1 OFDM symbols and the GP.

Optionally, in the time length occupied by the GP, there is one OFDM symbol, sent by the second terminal, with a subcarrier spacing of $\Delta f_2$, and a frequency resource corresponding to the OFDM symbol, sent by the second terminal, with a subcarrier spacing of $\Delta f_2$ overlaps a frequency resource allocated to the first terminal in the time unit.

Optionally, when a sampling rate is 1.92 MHz, the type-1 OFDM symbol includes a symbol sampling point part and a CP part, where a time length of the symbol sampling point part is 512 $T_s$, a time length of the CP part is 17 $T_s$, a time length occupied by the type-1 OFDM symbol is 529 $T_s$, and a time length of $T_s$ is a time length corresponding to each sampling point at the 1.92 MHz sampling rate; and the length of the GP is equal to a time length occupied by one type-2 OFDM symbol in a Long Term Evolution LTE system.

Optionally, if a length of the time unit is 1 ms, $\Delta f_1=3.75$ kHz, and $\Delta f_2=15$ kHz, the frame structure is a second frame structure, where the second frame structure includes three type-1 OFDM symbols and the GP.

Optionally, when a sampling rate is 1.92 MHz, the three type-1 OFDM symbols are respectively a symbol 0, a symbol 1, and a symbol 2, where the symbol 0 includes a first symbol sampling point part and a first CP part, a time length of the first symbol sampling point part is 512 $T_s$, a time length of the first CP part is 36 $T_s$, a time length occupied by the symbol 0 is 548 $T_s$, and a time length of $T_s$ is a time length corresponding to each sampling point at the 1.92 MHz sampling rate; the symbol 1 includes a second symbol sampling point part and a second CP part, a time length of the second symbol sampling point part is 512 $T_s$, a time length of the second CP part is 37 $T_s$, and a time length occupied by the symbol 1 is 549 $T_s$; the symbol 2 is the same as the symbol 0, or the symbol 2 is the same as the symbol 1; and the length of the GP is equal to a time length occupied by two type-2 OFDM symbols in LTE.

According to a third aspect, an embodiment of the present application provides user equipment, where the user equipment includes a processor and a transmitter. The processor is configured to determine a frame structure in a time unit, where the frame structure indicates that N type-1 orthogonal frequency division multiplexing OFDM symbols and a guard period GP are included in the time unit, a subcarrier spacing of each type-1 OFDM symbol is $\Delta f_1$, a time length of the GP is greater than or equal to a time length occupied by one type-2 OFDM symbol, a subcarrier spacing of the type-2 OFDM symbol is $\Delta f_2$, $\Delta f_1$ is unequal to $\Delta f_2$, and N is a positive integer; and the transmitter is configured to send the type-1 OFDM symbols according to the frame structure.

Therefore, according to the user equipment in this embodiment of the present application, a frame structure in a time unit is determined. The frame structure includes N type-1 OFDM symbols with a subcarrier spacing of $\Delta f_1$ and a GP, and a length of the GP is greater than or equal to a time length occupied by one OFDM symbol with a subcarrier spacing of $\Delta f_2$. Therefore, when an NB-IOT system is deployed in an LTE system in an embedded manner, and when an NB-IOT terminal is sending data, a channel resource of the legacy LTE system can be adequately utilized, and a conflict with a legacy LTE SRS can be avoided.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

FIG. 12 is a flowchart of a data transmission method according to an embodiment of the present application;

FIG. 13 is a structural block diagram of user equipment according to an embodiment of the present application;

DESCRIPTION OF EMBODIMENTS

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

It should be understood that the technical solutions in the embodiments of the present application may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution system, an LTE frequency division duplex (FDD) system, an LTE time division duplex (TDD) system, a Universal Mobile Telecommunications System (UMTS), or a Worldwide Interoperability for Microwave Access (WiMAX) communications system.

For example, a base station may be a base station (BTS) in GSM or CDMA, may be a base station (NodeB, "NB" for short) in WCDMA, or may be an evolved NodeB ("e-NB" or "e-NodeB" for short) in LTE. This is not limited in the present application.

For another example, UE may be referred to as a terminal, a mobile station (MS), or a mobile terminal. The UE may communicate with one or more core networks by using a radio access network (RAN). For example, the user equipment may be a mobile phone (also referred to as a "cellular" phone) or a computer with a mobile terminal. For example, the user equipment may further be a portable, pocket-sized, handheld, computer built-in, or in-vehicle mobile apparatus, which exchanges voice and/or data with the radio access network.

It should be further understood that the embodiments of the present application are described only by using an LTE system as an example, but the present application is not limited thereto, and the method and the apparatus in the embodiments of the present application may be further applied to another communications system. Similarly, the embodiments of the present application are also described only by using user equipment in the LTE system as an example, but the present application is not limited thereto, and the method and the apparatus in the embodiments of the present application may be further applied to a base station and user equipment in another communications system.

Figure 1:
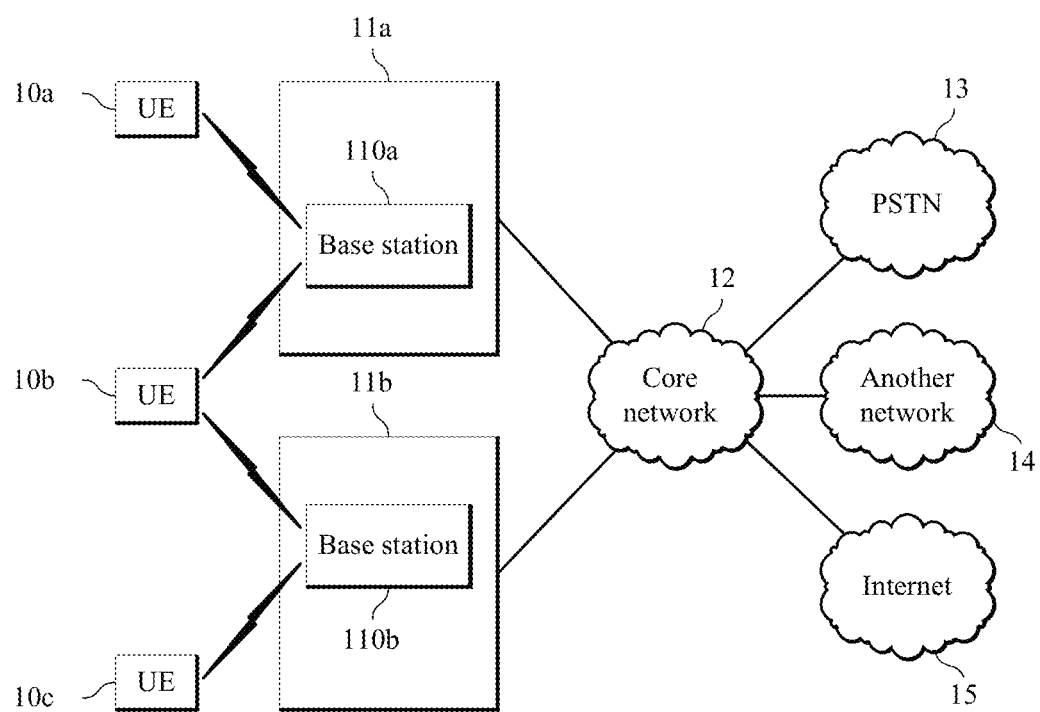
FIG. 1 is a schematic diagram of a communications system.

FIG. 1 is a schematic diagram of a communications system. In FIG. 1, UE may communicate with a core network by using one or more base stations. For example, in FIG. 1, UE 10a may communicate with a core network 12 by using a base station 110a on a radio access network 11a. UE 10b may communicate with the core network 12 by using the base station 110a on the radio access network 11a or by using a base station 110b on a radio access network 11b. UE 10c may communicate with the core network 12 by using the base station 110b on the radio access network 11b. Further, the UE may communicate with a public switched telephone network (Public Switched Telephone Network, PSTN) 13, another network 14, or even the entire Internet 15.

Figure 2:
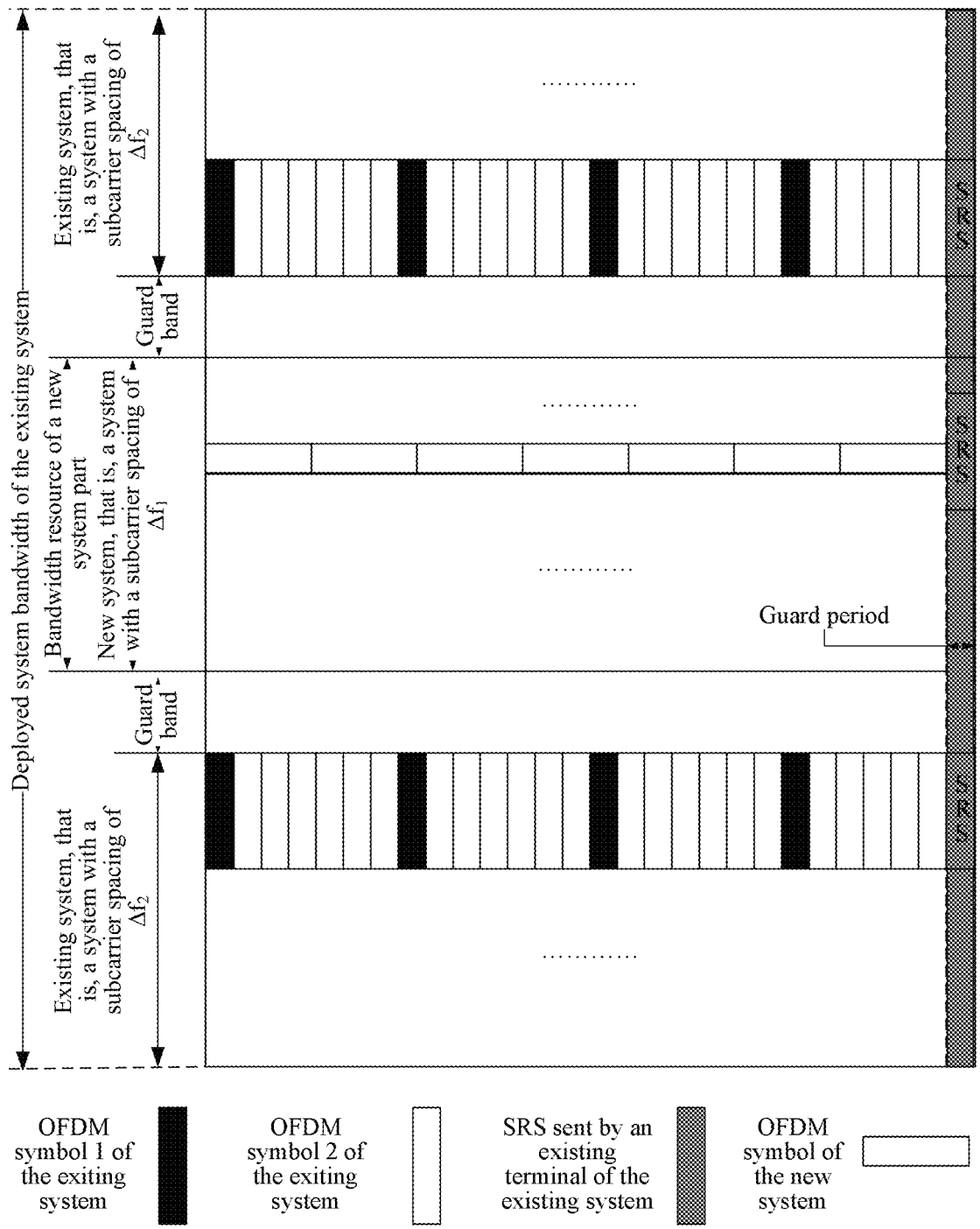
FIG. 2 is a schematic diagram of an application scenario according to an embodiment of the present application.

FIG. 2 is a schematic diagram of an application scenario according to an embodiment of the present application. As shown in FIG. 2, a system with a subcarrier spacing of $\Delta f_2$ may be an existing OFDM system, that is, an existing system. An OFDM system with a subcarrier spacing of $\Delta f_1$ may be a new system. The new system is deployed for meeting a new service requirement. The new system and the existing system may have different subcarrier spacings, that is, $\Delta f_1 \neq \Delta f_2$.

It should be noted that values of $\Delta f_1$ and $\Delta f_2$ are not limited in this embodiment of the present application. For example, $\Delta f_1 = \frac{1}{2} \times \Delta f_2$, $\Delta f_1 = \frac{1}{4} \times \Delta f_2$, or $\Delta f_1 = \frac{1}{6} \times \Delta f_2$. Generally, when a relationship between $\Delta f_1$ and $\Delta f_2$ is being designed, a multiple relationship with a factor of a prime number such as 2, 3, or 5 is considered. Subsequent embodiments of the present application are described by mainly using $\Delta f_1 = 3.75$ kHz and $\Delta f_2 = 15$ kHz as an example.

It should be understood that the new system may be deployed in a time-frequency resource of the existing system, a bandwidth of the new system is $W_{\Delta f2}$, and some system resources of the existing system are used in a manner of frequency division multiplexing (FDM) or a manner of time division multiplexing (TDM) and FDM. The existing system is a deployed OFDM system, and when the new system is being deployed, existing user equipment of the OFDM system with a subcarrier spacing of $\Delta f_2$ has already been deployed and used on a live network. The existing user equipment may not know existence of the OFDM system with a subcarrier spacing of $\Delta f_1$. Therefore, an OFDM symbol with a subcarrier spacing of $\Delta f_2$ may be sent in all resources or some resources of all resources in the entire bandwidth $W_{\Delta f2}$ of the existing system.

Therefore, in a frame structure for data transmission in this embodiment of the present application, when the new system corresponds to a frame structure of one time unit, a part of time is reserved as a GP in a particular location of each time unit, for avoiding interference with the OFDM symbol, sent by the existing user equipment of the existing system, with a subcarrier spacing of $\Delta f_2$. For the frame structure, in the time of the GP, even if the existing user equipment of the existing OFDM system sends a signal in a resource of the new system, the signal may not overlap an OFDM symbol, of user equipment of the new system, with a subcarrier spacing of $\Delta f_1$, thereby avoiding mutual interference and impact.

Currently, a sending and receiving structure of an OFDM system are generally implemented by using an inverse fast Fourier transformation (IFFT) processing module and a fast Fourier transformation (FFT) processing module. Assuming that a subcarrier spacing of the OFDM system is Δf Hz, and that a sampling rate S Hz is used, a quantity of FFT points of IFFT processing used by the OFDM system is S/Δf, and is defined as X. For a sending apparatus using OFDM modulation, serial-to-parallel conversion is performed on a to-be-sent symbol sequence (optionally, sometimes a zero-adding operation is further required), several zeros are added to every X symbols output after the serial-to-parallel conversion, every X symbols are used as a group for IFFT processing, parallel-to-serial conversion is performed after X output symbols are obtained, and then, X symbol sampling points on a time domain are obtained. To resist interference caused by a multipath, after the IFFT processing, the OFDM modulation sending apparatus may insert a cyclic prefix including several sampling points (assuming that a quantity is Y) in front of the X symbol sampling points. Actually, the cyclic prefix is formed by repeating the last Y sampling points of the X symbol sampling points and inserting the last Y sampling points in front of the X symbol sampling points. Therefore, a final OFDM symbol corresponds to (X+Y) sampling points on the time domain, and a time corresponding to the OFDM symbol is a time length of $(X+Y) \times T_s$ seconds, where $T_s$ is a reciprocal of the sampling rate S Hz. It should be noted that a time $Y \times T_s$ corresponding to the cyclic prefix should be greater than a threshold Threshold$_{CP}$, where the threshold is a length of multipath delay spread of a channel between a receiver and a sender, and is determined by a communication environment in which the receiver and the sender are located.

It should be noted that, because SC-FDMA transmission is actually performing DFT processing on a time-domain signal, mapping a processed signal onto a subcarrier of a corresponding frequency resource, and then modulating the signal in an OFDM modulation manner and sending a modulated signal. Therefore, in the present application, terms such as an "OFDM system" and an "OFDM symbol" are used uniformly for description. However, the content of the present application is also applicable to a scenario of SC-FDMA transmission.

It should be understood that, in this embodiment of the present application, an OFDM symbol with a subcarrier spacing of $\Delta f_1$ may be referred to as a type-1 OFDM symbol, and an OFDM symbol with a subcarrier spacing of $\Delta f_2$ may be referred to as a type-2 OFDM symbol.

Figure 3:
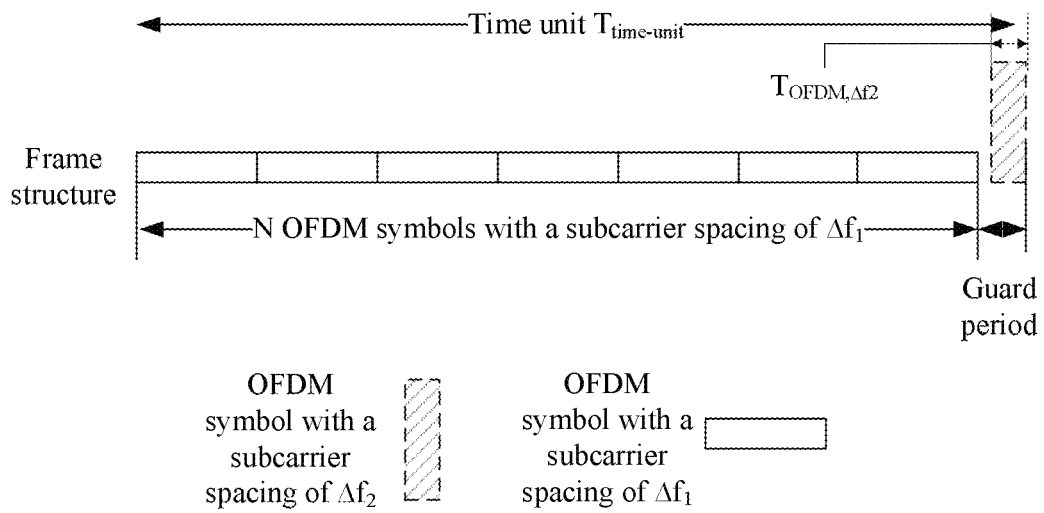
FIG. 3 is a schematic diagram of a frame structure for data transmission according to an embodiment of the present application.

FIG. 3 is a schematic diagram of a frame structure for data transmission according to an embodiment of the present application. The frame structure corresponds to one time unit, and the frame structure in one time unit may include N OFDM symbols with a subcarrier spacing of $\Delta f_1$ and a GP, where a length of the GP may be greater than or equal to a time length occupied by one OFDM symbol with a subcarrier spacing of $\Delta f_2$, $\Delta f_1$ is unequal to $\Delta f_2$, and N is a positive integer.

Optionally, the time unit may be 1 ms, 2 ms, 4 ms, 5 ms, or the like.

It should be noted that the term "frame structure" used in the present application represents only a symbol structure, a symbol quantity, and a GP length in one time unit. The term represents a general concept rather than representing that the time unit corresponds to a length of one frame. One time unit in the present application may correspond to a slot (Slot), a subframe (sub-frame), a frame (Frame), and the like. Frame structures corresponding to these time units may correspondingly refer to a slot structure, a subframe structure, and a frame structure. That is, although the term of frame structure is used in the present application, the frame structure actually may also refer to a subframe structure, a slot structure, and the like in general.

It should be understood that, after a time occupied by N OFDM symbols with a subcarrier spacing of $\Delta f_1$ is subtracted from one time unit, a remaining time may be a time occupied by a GP.

It should be further understood that, assuming that a time length of the time unit corresponding to the frame structure is $T_{time-unit}$, a value of N is a maximum quantity of OFDM symbols with a subcarrier spacing of $\Delta f_1$ that can be carried in a remaining time of the time unit $T_{time-unit}$ after the time that one OFDM symbol with a subcarrier spacing of $\Delta f_2$ needs to occupy is subtracted.

For example, when a time length of a time unit corresponding to the frame structure is $T_{time-unit}$, a value of N may be a greatest integer less than or equal to $[\Delta f1 * (T_{time-unit} - T_{OFDM,\Delta f2})]$, where $T_{OFDM,\Delta f2}$ is the time length occupied by one OFDM symbol with a subcarrier spacing of $\Delta f_2$.

Optionally, when a data sampling rate is F, a time length corresponding to each sampling point is $T_s$, where $T_s = 1/F$. One OFDM symbol with a subcarrier spacing of $\Delta f_1$ may include FFT$_{\Delta f1}$ symbol sampling points and CP$_{\Delta f1}$ cyclic prefix (CP) sampling points. One OFDM symbol with a subcarrier spacing of $\Delta f_2$ may include FFT$_{\Delta f2}$ symbol sampling points and CP$_{\Delta f2}$ cyclic prefix sampling points; a time length occupied by a cyclic prefix of the orthogonal frequency division multiplexing OFDM symbol with a subcarrier spacing of $\Delta f_1$ is CP$_{\Delta f1}$*Ts, and is not lower than a preset threshold (Threshold$_{CP}$). A time length occupied by a cyclic prefix of the OFDM symbol with a subcarrier spacing of $\Delta f_2$ is CP$_{\Delta f2}$*Ts, and is not lower than the preset threshold (Threshold$_{CP}$).

Optionally, the GP in the frame structure may be behind or in the middle of the N OFDM symbols with a subcarrier spacing of $\Delta f_1$.

Optionally, the length of the GP in this embodiment of the present application may be greater than or equal to a time length of the time length occupied by one OFDM symbol with a subcarrier spacing of $\Delta f_2$ plus the Threshold$_{CP}$, where $\Delta f_1$ is unequal to $\Delta f_2$, and N is a positive integer.

Therefore, according to the frame structure in this embodiment of the present application, the frame structure includes N OFDM symbols with a subcarrier spacing of $\Delta f_1$ and a GP, where a length of the GP is greater than or equal to a time length occupied by one OFDM symbol with a subcarrier spacing of $\Delta f_2$. Therefore, when an NB-IOT system is deployed in an LTE system in an embedded manner, and when NB-IOT user equipment is sending data, a channel resource of the legacy LTE system can be adequately utilized, and a conflict with a legacy LTE SRS can be avoided.

Optionally, the existing system may be an existing LTE system, the subcarrier spacing $\Delta f_2$ of the existing system may be 15 kHz, and the subcarrier spacing $\Delta f_1$ of the new system may be 3.75 kHz.

It should be understood that existing UE of the existing LTE system may send an SRS on the last symbol of OFDM symbols with a subcarrier spacing of 15 kHz in each 1 ms subframe.

It should be further understood that, according to an existing LTE stipulation, existing LTE user equipment may send an SRS over a full bandwidth in a time sharing manner according to the full bandwidth or according to a frequency hopping pattern. Therefore, when UE of the existing LTE system sends an SRS in a frequency resource of the new system, the SRS may conflict with an OFDM symbol, sent by UE of the new system, with a subcarrier spacing of 3.75 kHz, which causes mutual interference.

Therefore, to avoid interference between the new system and the SRS of the existing LTE system, in the frame structure for data transmission in this embodiment of the present application, for example, a frame structure of a 2 ms subframe, a GP is reserved at the end of the frame structure, where a length of the GP is greater than or equal to a length of one OFDM symbol of the existing LTE system.

It should be understood that, when a frame boundary of the new system and a frame boundary of the existing system keep aligned, the OFDM symbol with a subcarrier spacing of 3.75 kHz of the new system may not interfere with the SRS sent by the UE of the existing LTE system. In addition, the frame structure can ensure a maximum quantity of OFDM symbols, carried in each time unit, with a subcarrier spacing of 3.75 kHz, to ensure transmission efficiency of the new system.

It should be noted that, in the present application, the "frame boundary" is used to align a boundary of a time unit of the new system with a boundary of a time unit of the existing system. In the present application, the frame boundary of the new system and the frame boundary of the existing system keep aligned, which may represent that a boundary of a subframe (or a slot, or a frame) of the new system is aligned with a subframe boundary (or a slot boundary, or a frame boundary) of the existing system. That is, although the term of frame boundary is used in the present application, the frame boundary actually may also refer to a subframe boundary, a slot boundary, and the like in general.

It should be understood that a frame structure in a time unit of 2 ms may be referred to as a "2 ms subframe" for short, a frame structure in a time unit of 1 ms may be referred to as a "1 ms subframe" for short, and a frame structure in a time unit of 5 ms may be referred to as a "5 ms subframe" for short. The 1 ms subframe or 2 ms subframe or 5 ms subframe may be uniformly used for expression subsequently, and no detailed description is provided.

Figure 4:
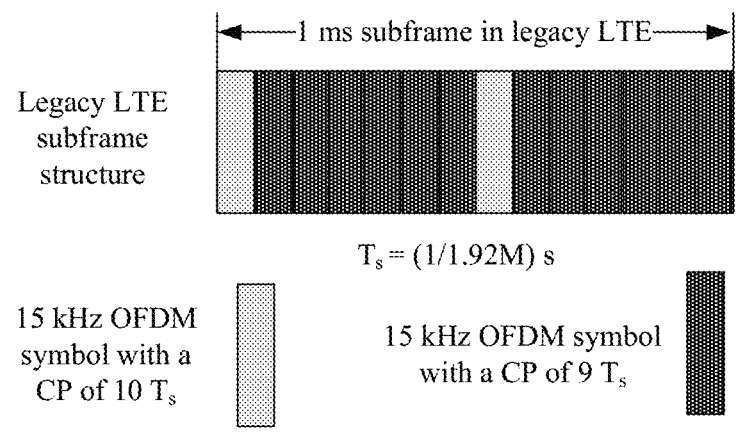
FIG. 4 is a schematic diagram of a frame structure of a 1 ms subframe of user equipment in a legacy LTE system.

FIG. 4 is a schematic diagram of a frame structure of a 1 ms subframe of UE in a legacy LTE system. A symbol sampling rate in the frame structure is assumed to be 1.92 MHz, a quantity of points of an FFT operation is 128, and the frame structure of the 1 ms subframe may include twelve OFDM symbols with a CP length of 9 $T_s$ and a subcarrier spacing of 15 kHz, and two OFDM symbols with a CP length of 10 $T_s$ and a subcarrier spacing of 15 kHz.

It should be understood that the frame structure, shown in FIG. 4, of the 1 ms subframe of the UE of the legacy LTE system cannot support an OFDM symbol with a subcarrier spacing of 3.75 kHz.

It should be understood that the present application is described by using an assumption of a 1.92 MHz sampling rate. Actually, when the Nyquist sampling condition is met, different sampling rates may be used for a same signal. For a same symbol, if sampling is performed at a different sampling rate (for example, a sampling rate A times a reference sampling rate), a time length $T_s$ corresponding to each corresponding sampling point may be proportionally reduced to 1/A of a time corresponding to each sampling symbol at the reference sampling rate, and a quantity of sampling points corresponding to the same symbol is multiplied to A times a quantity of sampling points at the reference sampling rate. For an OFDM symbol, a quantity of points of FFT processing corresponding to the OFDM symbol is also multiplied to A times a quantity of points of FFT processing at the reference sampling rate.

For example, in the schematic diagram, shown in FIG. 4, of the frame structure of the 1 ms subframe in the legacy LTE system, if the used sampling rate is assumed to be 1.92 MHz, $T_s=(1/1.92 M)s$, a quantity of points of an FFT operation is 128, and the 1 ms subframe may include twelve OFDM symbols with a CP length of 9 $T_s$ and a subcarrier spacing of 15 kHz, and two OFDM symbols with a CP length of 10 $T_s$ and a subcarrier spacing of 15 kHz. If the used sampling rate is 30.72 MHz (16 times a reference sampling rate of 1.92 MHz), $T_s=(1/30.72 M)s$, which is 1/16 of $T_s$ at the reference sampling rate of 1.92 MHz, a quantity of points of FFT processing is multiplied by 16 times, that is, 2048, and the LTE 1 ms subframe may include twelve OFDM symbols with a CP length of (16×9) $T_s$ and a subcarrier spacing of 15 kHz, and two OFDM symbols with a CP length of (16×10) $T_s$ and a subcarrier spacing of 15 kHz. That is, different sampling rates correspond to different representation manners for a same frame structure and symbol structure. At different sampling rates, the quantity of sampling points is proportionally increased (or decreased), an absolute time of $T_s$ is proportionally decreased (or increased), and a time length of a finally represented symbol and a frame structure are consistent. Representations at different sampling rates are merely different representations for a frame structure, a symbol structure, and a GP length in a same time unit.

Optionally, the frame structure shown in FIG. 3 in this embodiment of the present application may be applied to the application scenario shown in FIG. 2. In the scenario, the new system corresponds to an NB-IOT system, and a subcarrier spacing $\Delta f_1$ of the new system may be 3.75 kHz. The existing system corresponds to an existing LTE system, and a subcarrier spacing of the existing system may be 15 kHz. UE in the NB-IOT system may use SC-FDMA transmission with a subcarrier spacing of 3.75 kHz on an uplink.

Optionally, in this embodiment, the frame structure may be a frame structure of a 2 ms subframe. The frame structure may be a first frame structure, and may include seven OFDM symbols with a subcarrier spacing of 3.75 kHz and a GP, where a length of the GP is greater than or equal to a time length occupied by one OFDM symbol with a subcarrier spacing of 15 kHz.

Figure 5:
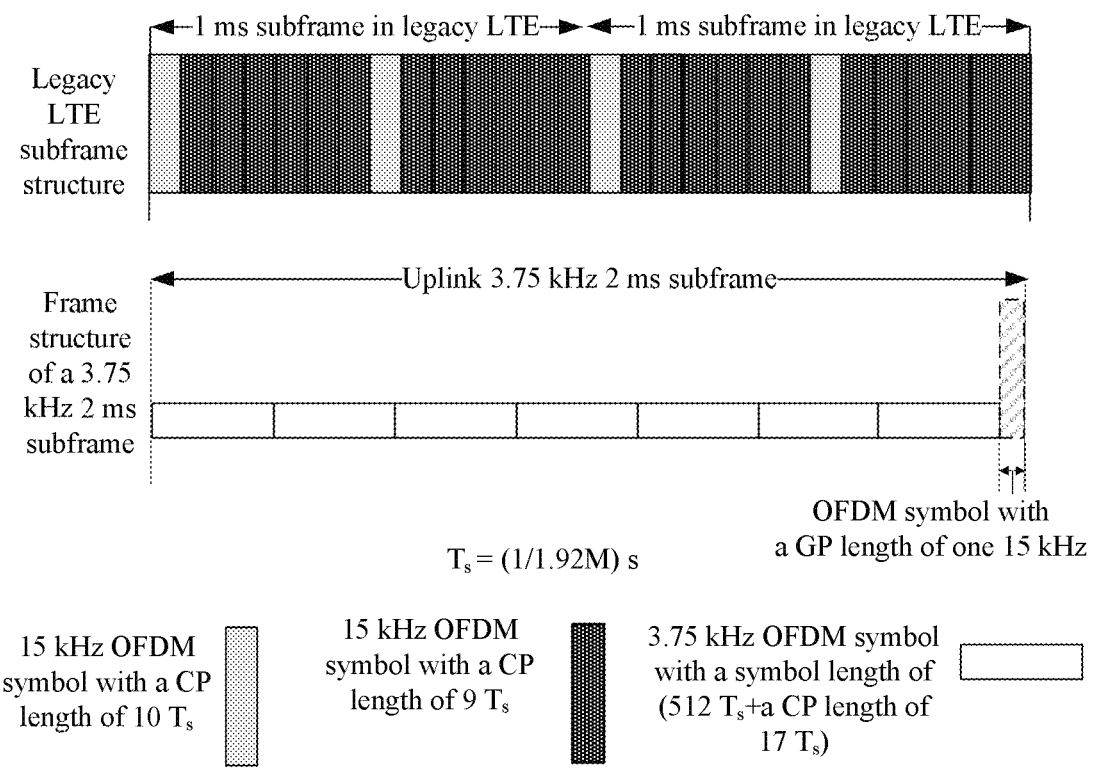
FIG. 5 is a schematic diagram of a frame structure of a 2 ms subframe according to an embodiment of the present application.

It should be understood that a frame structure of a 2 ms subframe may be shown in FIG. 5, where the frame structure of the 2 ms subframe shown in FIG. 5 may include seven OFDM symbols with a subcarrier spacing of 3.75 kHz and a GP located behind the seven OFDM symbols with a subcarrier spacing of 3.75 kHz, and a length of the GP is equal to a time length occupied by one OFDM symbol with a subcarrier spacing of 15 kHz.

More specifically, structure parameters of the frame structure of the 2 ms subframe shown in FIG. 5 may be shown in Table 1. A sampling rate corresponding to the structure parameters shown in Table 1 is 1.92 MHz. Correspondingly, a time length $T_s$ corresponding to each sampling point is a reciprocal of the sampling rate, that is, $T_s=(1/1.92 M)s$.

It is understandable that, if another sampling rate is used, it is required to only perform equal proportion adjustment on a corresponding sampling point quantity in the table according to the sampling rate. To avoid repetition, no enumeration is made herein.

TABLE 1

| Time length (ms) | Frame structure | | | | |
|---|---|---|---|---|---|
| 2 | Structure of a symbol with a subcarrier spacing of 3.75 kHZ | | | | Duration of a guard period (GP) |
| | $FFT_{\Delta f1}$ | $CP_{\Delta f1}$ | Length of an OFDM symbol | Quantity N of symbols | $(128 + 9)\, T_s$ |
| | 512 | 17 | $529\, T_s$ | 7 | |

$FFT_{\Delta f1}$ represents a quantity of sampling points corresponding to a symbol sampling point part corresponding to each OFDM symbol with a subcarrier spacing of $\Delta f_1$, and $CP_{\Delta f1}$ represents a quantity of sampling points corresponding to a cyclic prefix CP part of each OFDM symbol with a subcarrier spacing of $\Delta f_1$. It can be known from a definition of an OFDM symbol that one OFDM symbol with a subcarrier spacing of $\Delta f_1$ includes $CP_{\Delta f1}$ CP sampling points and immediately following $FFT_{\Delta f1}$ symbol sampling points. Therefore, one OFDM symbol with a subcarrier spacing of $\Delta f_1$ totally includes $(FFT_{\Delta f1}+CP_{\Delta f1})$ sampling points, and corresponds to a time length of $(FFT\Delta f_1+CP\Delta f_1)\times T_s$.

More specifically, the parameters of the frame structure of the 2 ms subframe shown in Table 1 may include parameters of the OFDM symbol with a subcarrier spacing of 3.75 kHz and the GP, where the parameters may include a quantity of FFT points, a CP length of the OFDM symbol with a subcarrier spacing of 3.75 kHz, a symbol quantity of OFDM symbols with a subcarrier spacing of 3.75 kHz, a symbol length of the OFDM symbol with a subcarrier spacing of 3.75 kHz, a time length, and duration of the GP.

When the sampling rate is 1920 kHz, the frame structure of the 2 ms subframe includes seven (N=7) OFDM symbols with a subcarrier spacing of 3.75 kHz, where each OFDM symbol includes 512 symbol sampling points (a corresponding quantity of FFT points is 512) and a CP including 17 sampling points. Therefore, a time occupied by the CP is 17 $T_s$, and the whole OFDM symbol corresponds to 529 sampling points (that is, 512 symbol sampling points+17 CP sampling points), and an occupied time is a time length of $529\times T_s$. The length of the GP is equal to the time length occupied by one OFDM symbol with a subcarrier spacing of 15 kHz in the existing LTE system, that is, a time length corresponding to $(128+9)$ sampling points.

In another example of the frame structure shown in FIG. 5, structure parameters of the frame structure may be shown in Table 2. A sampling rate corresponding to the frame structure parameters shown in Table 2 is 1.92 MHz. Correspondingly, a time length $T_s$ corresponding to each sampling point is a reciprocal of the sampling rate, that is, $T_s=(1/1.92\,M)s$.

It is understandable that, if a sampling rate of another numerical value is used, it is required to only perform equal proportion adjustment on a corresponding sampling point quantity in the table according to the sampling rate. To avoid repetition, no enumeration is made herein.

TABLE 2

| Time length (ms) | Frame structure | | | | |
|---|---|---|---|---|---|
| 2 | Structure of a symbol with a subcarrier spacing of 3.75 kHZ | | | | Duration of a guard period (GP) |
| | $FFT_{\Delta f1}$ | $CP_{\Delta f1}$ | Length of an OFDM symbol | Quantity N of symbols | $[(128 + 9) + 14]\, T_s$ |
| | 512 | 15 | $527\, T_s$ | 7 | |

$FFT_{\Delta f1}$ represents a quantity of sampling points corresponding to a symbol sampling point part corresponding to each OFDM symbol with a subcarrier spacing of $\Delta f_1$, and $C_{P\Delta f1}$ represents a quantity of sampling points corresponding to a cyclic prefix CP part of each OFDM symbol with a subcarrier spacing of $\Delta f_1$. It can be known from a definition of an OFDM symbol that one OFDM symbol with a subcarrier spacing of $\Delta f_1$ includes $CP\Delta f_1$ CP sampling points and immediately following $FFT_{\Delta f1}$ symbol sampling points. Therefore, one OFDM symbol with a subcarrier spacing of $\Delta f_1$ totally includes $(FFT_{\Delta f1}+CP_{\Delta f1})$ sampling points, and corresponds to a time length of $(FFT\Delta f_1+CP\Delta f_1)\times T_s$.

More specifically, the parameters of the frame structure in a time unit of 2 ms shown in Table 2 may include parameters of the OFDM symbol with a subcarrier spacing of 3.75 kHz and the GP, where the parameters may include a quantity of FFT points, a CP length of the OFDM symbol with a subcarrier spacing of 3.75 kHz, a symbol quantity of OFDM symbols with a subcarrier spacing of 3.75 kHz, a symbol length of the OFDM symbol with a subcarrier spacing of 3.75 kHz, a time length of a frame, and duration of the GP.

When the sampling rate is 1920 kHz, the frame structure in a time unit of 2 ms includes seven (N=7) OFDM symbols with a subcarrier spacing of 3.75 kHz, where each OFDM symbol includes 512 symbol sampling points (a corresponding quantity of FFT points is 512) and a CP including 15 sampling points. Therefore, a time occupied by the CP is 15 $T_s$, and the whole OFDM symbol corresponds to 527 sampling points (that is, 512 symbol sampling points+15 CP sampling points), and an occupied time is a time length of $527\times T_s$. The length of the GP is $(128+9+14)\, T_s$, which is greater than a time length of the time length occupied by one OFDM symbol with a subcarrier spacing of 15 kHz in the existing LTE system plus one $Threshold_{CP}$.

It can be seen from Table 1 and Table 2 that, on one hand, behind the seven OFDM symbols with a subcarrier spacing of 3.75 kHz, there is a GP with a time length of one OFDM symbol with a subcarrier spacing of 15 kHz. When a frame boundary of the NB-IOT system and a legacy LTE frame boundary are aligned (as shown in FIG. 5), because a frame structure of a 2 ms subframe of the NB-IOT includes a GP, the last symbol of every two LTE frames of legacy LTE UE does not overlap any OFDM symbol with a subcarrier spacing of 3.75 kHz of an NB-IOT terminal in the NB-IOT frame in terms of time. Because an SRS of the existing LTE system is sent on only the last symbol of OFDM symbols with a subcarrier spacing of 15 kHz of each LTE 1 ms subframe, the frame structure of the 2 ms subframe in FIG. 5 of the present application can be introduced to ensure that the SRS sent in the last subframe of every two subframes in the LTE system does not interfere with any NB-IOT OFDM symbol with a subcarrier spacing of 3.75 kHZ.

Therefore, on a network, a transmission mode of a channel sounding reference signal in a cell may be appropriately configured, for example, it is configured that only the second subframe of two subframes is a subframe in which the channel sounding reference signal can be sent, to avoid interference between an NB IOT terminal and an SRS of an existing LTE terminal.

On the other hand, in each subframe of the NB IOT, there are seven OFDM symbol resources in each time unit of 2 ms, which is a maximum quantity of OFDM symbols with a subcarrier spacing of 3.75 kHz that can be carried in every 2 ms. Therefore, transmission efficiency of the NB IOT system is ensured. Compared with legacy LTE, resource efficiency of the NB IOT system is not decreased. In addition, a CP length of each OFDM symbol with a subcarrier spacing of 3.75 kHz is 17 $T_s$, and greater delay spread can be tolerated.

Therefore, according to the frame structure for data transmission in this embodiment of the present application, a frame structure in a time unit is designed, where the frame structure includes N OFDM symbols with a subcarrier spacing of $\Delta f_1$ and a GP, and a length of the GP is greater than or equal to a time length occupied by one OFDM symbol with a subcarrier spacing of $\Delta f_2$. Therefore, when an NB-IOT system is deployed in an LTE system in an embedded manner, and when an NB-IOT terminal is sending data, a channel resource of the legacy LTE system can be adequately utilized, and a conflict with a legacy LTE SRS can be avoided.

It should be understood that the 1 ms subframe already exists in the existing LTE system, in the present application, the NB-IOT system is embedded in the LTE system, and UE of the NB-IOT system may use the foregoing 2 ms subframe.

Optionally, when the time unit is 1 ms, $\Delta f_1$=3.75 kHz, and $\Delta f_2$=15 kHz, the frame structure may be a second frame structure, and may include three OFDM symbols with a subcarrier spacing of 3.75 kHz and a GP, where a length of the GP is greater than or equal to a time length occupied by one OFDM symbol with a subcarrier spacing of 15 kHz.

Figure 6:
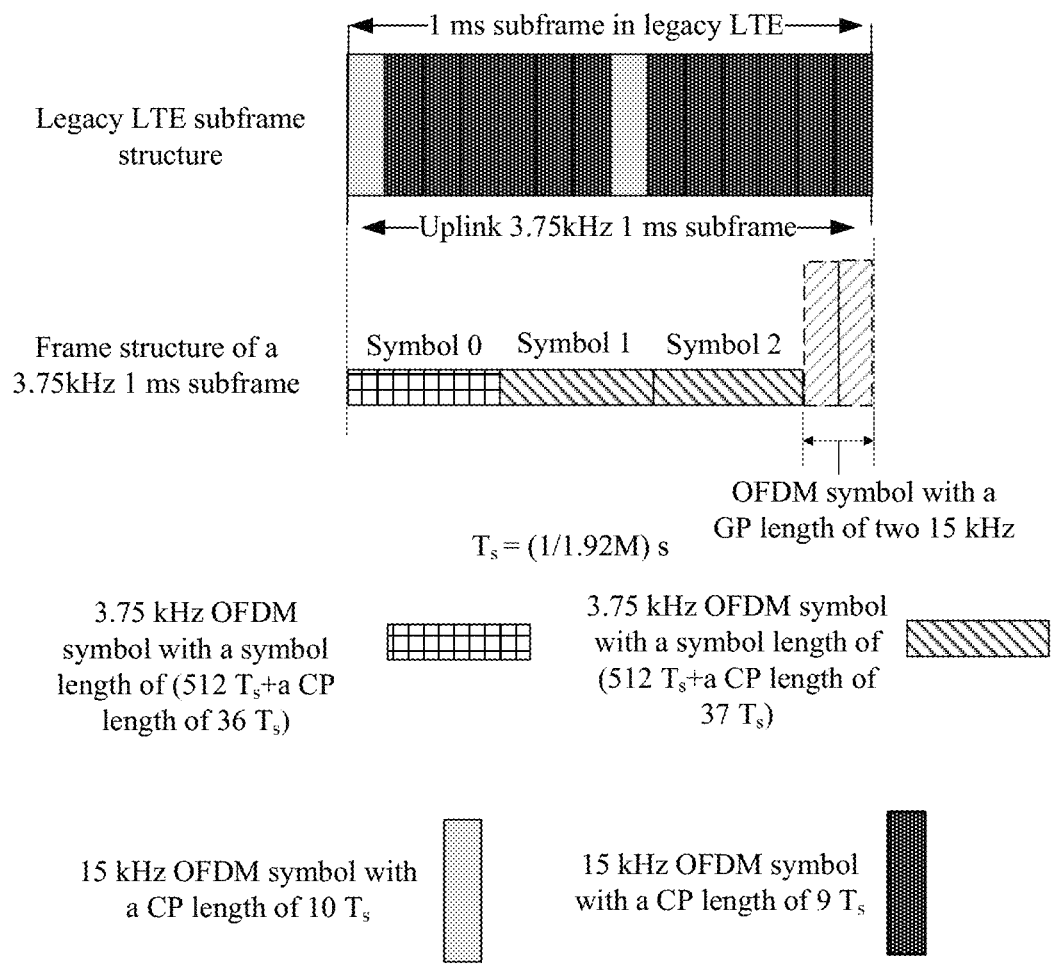
FIG. 6 is a schematic diagram of a frame structure of a 1 ms subframe according to an embodiment of the present application.

Optionally, a frame structure of a 1 ms subframe in an embodiment of the present application may be shown in FIG. 6. The frame structure may be applied to the application scenario shown in FIG. 2. In the scenario, the new system corresponds to an NB-IOT system, and a subcarrier spacing $\Delta f_1$ of the new system may be 3.75 kHz. The existing system corresponds to an existing LTE system, and a subcarrier spacing $\Delta f_1$ of the existing system may be 15 kHz. An NB-IOT terminal may use SC-FDMA transmission with a subcarrier spacing of 3.75 kHz on an uplink. In this case, the 1 ms subframe shown in FIG. 6 may be used.

The frame structure of the 1 ms subframe in this embodiment of the present application may include three OFDM symbol with a subcarrier spacing of 3.75 kHz and a GP located behind the three OFDM symbols with a subcarrier spacing of 3.75 kHz, where a length of the GP may be greater than or equal to a time length occupied by one OFDM symbol with a subcarrier spacing of 15 kHz.

It should be understood that, in the NB-IOT, the frame structure of the 1 ms subframe may be shown in FIG. 6, and the frame structure of the 1 ms subframe may include three OFDM symbols with a subcarrier spacing of 3.75 kHz and a GP located behind the three OFDM symbols with a subcarrier spacing of 3.75 kHz, where a length of the GP may be equal to a time length occupied by two OFDM symbols with a subcarrier spacing of 15 kHz.

More specifically, parameters of the frame structure of the 1 ms subframe shown in FIG. 6 may be shown in Table 3, and a sampling rate corresponding to the structure parameters shown in Table 3 is 1.92 MHz. Correspondingly, a time length $T_s$ corresponding to each sampling point is a reciprocal of the sampling rate, that is, $T_s$=(1/1.92 M)s.

It is understandable that, if a sampling rate of another numerical value is used, it is required to only perform equal proportion adjustment on a corresponding sampling point quantity in the table according to the sampling rate. To avoid repetition, no enumeration is made herein.

TABLE 3

| Time length (ms) | Frame structure | | | | |
|---|---|---|---|---|---|
| 1 | Structures of three symbols with a subcarrier spacing of 3.75 kHz | | | | Duration of a guard period |
| | | $FFT_{\Delta f1}$ | $CP_{\Delta f1}$ | Length of an OFDM symbol | $2 \times (128 + 9)$ $T_s$ |
| | Structure of a symbol 0 | 512 | 36 | 548 $T_s$ | |
| | Structures of a symbol 1 and a symbol 2 | 512 | 37 | 549 $T_s$ | |

$FFT_{\Delta f1}$ represents a quantity of sampling points corresponding to a symbol sampling point part corresponding to each OFDM symbol with a subcarrier spacing of $\Delta f_1$, and $CP_{\Delta f1}$ represents a quantity of sampling points corresponding to a cyclic prefix CP part of each OFDM symbol with a subcarrier spacing of $\Delta f_1$. It can be known from a definition of an OFDM symbol that one OFDM symbol with a subcarrier spacing of $\Delta f_1$ includes $CP_{\Delta f1}$ CP sampling points and immediately following $FFT_{\Delta f1}$ symbol sampling points. Therefore, one OFDM symbol with a subcarrier spacing of $\Delta f_1$ totally includes ($FFT_{\Delta f1}+CP_{\Delta f1}$) sampling points, and corresponds to a time length of ($FFT\Delta f_1+CP_{\Delta f1}$)$\times T_s$.

More specifically, the parameters of the 1 ms subframe shown in Table 3 may include an OFDM symbol 0 with a subcarrier spacing of 3.75 kHz, an OFDM symbol 1 with a subcarrier spacing of 3.75 kHz, an OFDM symbol 2 with a subcarrier spacing of 3.75 kHz, and a GP. The parameters for representing the foregoing OFDM symbols and the GP may include a quantity of FFT points, a CP length of the OFDM symbol 0 with a subcarrier spacing of 3.75 kHz, CP lengths of the OFDM symbol 1 with a subcarrier spacing of 3.75 kHz and the OFDM symbol 2 with a subcarrier spacing of 3.75 kHz, a symbol length of the OFDM symbol 0 with a subcarrier spacing of 3.75 kHz, symbol lengths of the OFDM symbol 1 and symbol 2 with a subcarrier spacing of 3.75 kHz, a time length, a time length of the GP, and so on.

When the sampling rate is 1920 kHz, all symbol sampling point parts of the OFDM symbol 0 with a subcarrier spacing of 3.75 kHz and the symbol 1 and the symbol 2 correspond to 512 sampling points (a corresponding quantity of $FFT_{\Delta f1}$ points is 512), a quantity of CP sampling points of the OFDM symbol 0 with a subcarrier spacing of 3.75 kHz is 36, quantities of CP sampling points of the OFDM symbol 1 with a subcarrier spacing of 3.75 kHz and the OFDM symbol 2 with a subcarrier spacing of 3.75 kHz are 37, a first symbol length is 548 $T_s$, a second symbol length is 549 $T_s$, and the length of the GP is equal to a time length occupied by two OFDM symbols with a subcarrier spacing of 15 kHz in LTE.

When the sampling rate is 1920 kHz, each 1 ms subframe includes three (N=3) OFDM symbols with a subcarrier spacing of 3.75 kHz, where each OFDM symbol includes $FFT_{\Delta f1}$ symbol sampling points (a corresponding quantity of FFT points is $FFT_{\Delta f1}$) and a cyclic prefix including $CP_{\Delta f1}$ sampling points. Therefore, a time length occupied by the cyclic prefix is $CP_{\Delta f_1} \times T_s$, and the OFDM symbol with a subcarrier spacing of 3.75 kHz corresponds to $(FFT\Delta f_1 + CP\Delta f_1)$ sampling points, and occupies a time of $(FFT\Delta f_1 + CP\Delta f_1) \times T_s$.

Therefore, as shown in table 3, in each 1 ms subframe, the zeroth OFDM symbol with a subcarrier spacing of 3.75 kHz includes 512 symbol sampling points and a cyclic prefix CP including 36 sampling points. Therefore, a symbol time length of the symbol 0 is 548 $T_s$. The first or the second OFDM symbol with a subcarrier spacing of 3.75 kHz includes 512 symbol sampling points and a cyclic prefix CP including 37 sampling points. Therefore, both a symbol time length of the symbol 1 and a symbol time length of the symbol 2 are 549 $T_s$. A GP length of each 1 ms subframe is equal to a time length occupied by two OFDM symbols with a subcarrier spacing of 15 kHz in LTE, that is, a time length corresponding to $2\times(128+9)$ sampling points, that is, $2\times(128+9)\times T_s$, where $T_s$ is a time length corresponding to each sampling point, and is a reciprocal of the sampling rate.

It should be understood that FIG. 6 gives only an example of the embodiment of Table 3, and another arrangement manner of the OFDM symbols and the GP is not excluded in the present application.

Optionally, when the time unit is 1 ms, $\Delta f_1=3.75$ kHz, and $\Delta f_2=15$ kHz, the frame structure may be a third frame structure, and may include three OFDM symbols with a subcarrier spacing of 3.75 kHz and a GP, where a length of the GP is greater than or equal to a time length occupied by one OFDM symbol with a subcarrier spacing of 15 kHz.

Optionally, when the time unit is 2 ms, the frame structure is a fourth frame structure, where the fourth frame structure is formed by the second frame structure and/or the third frame structure.

Figure 7:
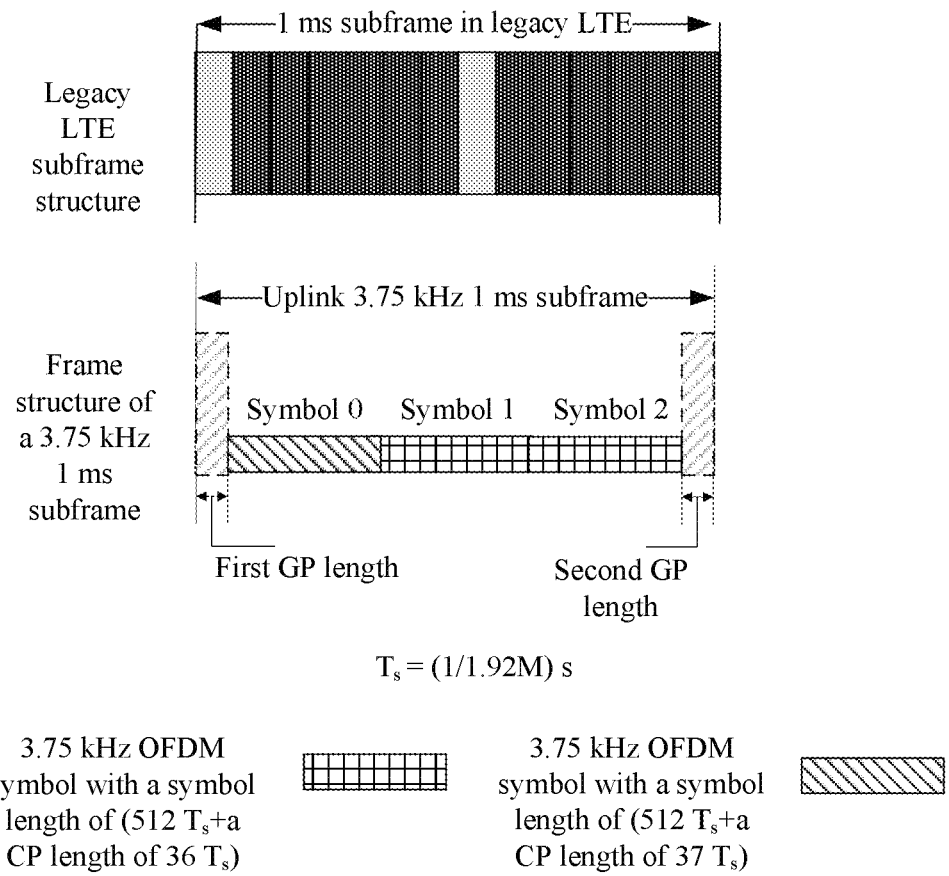
FIG. 7 is a schematic diagram of another frame structure of a 1 ms subframe according to an embodiment of the present application.

Optionally, another frame structure of a 1 ms subframe in this embodiment of the present application may be shown in FIG. 7. FIG. 7 is a frame structure of a 1 ms subframe for transmitting data according to an embodiment of the present application. The 1 ms subframe may be applied to the application scenario shown in FIG. 2. In the scenario, the new system corresponds to an NB-IOT system, and a subcarrier spacing $\Delta f_1$ of the new system may be 3.75 kHz. The existing system corresponds to an existing LTE system, and a subcarrier spacing $\Delta f_2$ of the existing system may be 15 kHz. An NB-IOT terminal may use SC-FDMA transmission with a subcarrier spacing of 3.75 kHz on an uplink. In this case, the 1 ms subframe shown in FIG. 7 may be used.

The frame structure of the 1 ms subframe in this embodiment of the present application may include three OFDM symbols with a subcarrier spacing of 3.75 kHz and a GP, where a length of the GP may be a time length occupied by two OFDM symbols with a subcarrier spacing of 15 kHz, and the GP may be divided into a first GP and a second GP.

It should be understood that the frame structure of the 1 ms subframe in the NB-IOT may be shown in FIG. 7, and the frame structure of the 1 ms subframe may include three OFDM symbols with a subcarrier spacing of 3.75 kHz, a first GP, and a second GP, where both the first GP and the second GP are a time length occupied by one OFDM symbol with a subcarrier spacing of 15 kHz, the first GP is located in front of the three OFDM symbols with a subcarrier spacing of 3.75 kHz, and the second GP is located behind the three OFDM symbols with a subcarrier spacing of 3.75 kHz.

More specifically, parameters of the 1 ms subframe shown in FIG. 7 may be shown in Table 4. A sampling rate corresponding to the parameters of the 1 ms subframe shown in Table 4 is 1.92 MHz. Correspondingly, a time length $T_s$ corresponding to each sampling point is a reciprocal of the sampling rate, that is, $T_s=(1/1.92 \text{ M})\text{s}$.

It is understandable that, if a sampling rate of another numerical value is used, it is required to only perform equal proportion adjustment on a corresponding sampling point quantity in the table according to the sampling rate. To avoid repetition, no enumeration is made herein.

TABLE 4

| | Frame structure | | | | |
|---|---|---|---|---|---|
| | Structures of three symbols with a subcarrier spacing of 3.75 kHz | | | Duration of a first guard period | Duration of a second guard period |
| Time length (ms) | | $FFT_{\Delta f_1}$ | $CP_{\Delta f_1}$ | Length of an OFDM symbol | | |
| 1 | Symbol 0 | 512 | 37 | 549 $T_s$ | $(128+10)\,T_s$ | $(128+9)\,T_s$ |
| | Structures of a symbol 1 and a symbol 2 | 512 | 36 | 548 $T_s$ | | |

$FFT_{\Delta f_1}$ represents a quantity of sampling points corresponding to a symbol sampling point part corresponding to each OFDM symbol with a subcarrier spacing of $\Delta f_1$, and $CP_{\Delta f_1}$ represents a quantity of sampling points corresponding to a cyclic prefix CP part of each OFDM symbol with a subcarrier spacing of $\Delta f_1$. It can be known from a definition of an OFDM symbol that one OFDM symbol with a subcarrier spacing of $\Delta f_1$ includes $CP_{\Delta f_1}$ CP sampling points and immediately following $FFT_{\Delta f_1}$ symbol sampling points. Therefore, one OFDM symbol with a subcarrier spacing of $\Delta f_1$ totally includes $(FFT_{\Delta f_1}+CP_{\Delta f_1})$ sampling points, and corresponds to a time length of $(FFT_{\Delta f_1}+CP_{\Delta f_1})\times T_s$.

More specifically, as shown in Table 4, the frame structure of the 1 ms subframe may include an OFDM symbol 0 with a subcarrier spacing of 3.75 kHz, an OFDM symbol 1 with a subcarrier spacing of 3.75 kHz, an OFDM symbol 2 with a subcarrier spacing of 3.75 kHz, a first GP, and a second GP. The parameters for representing the foregoing OFDM symbols and the GPs may include a quantity of FFT points and a CP length of the OFDM symbol 0 with a subcarrier spacing of 3.75 kHz, quantities of FFT points and CP lengths of the OFDM symbol 1 with a subcarrier spacing of 3.75 kHz and the symbol 2 with a subcarrier spacing of 3.75 kHz, and time lengths of the first GP and the second GP.

When the sampling rate is 1920 kHz, all symbol sampling point parts of the OFDM symbol 0 with a subcarrier spacing of 3.75 kHz and the symbol 1 and the symbol 2 correspond to 512 sampling points (a corresponding quantity of $FFT_{\Delta f1}$ points is 512), the CP length of the OFDM symbol 0 with a subcarrier spacing of 3.75 kHz is 37 $T_s$, the CP lengths of the OFDM symbol 1 with a subcarrier spacing of 3.75 kHz and the OFDM symbol 2 with a subcarrier spacing of 3.75 kHz are 36 $T_s$, the length of the symbol 0 is 549 $T_s$, the lengths of the symbol 1 and the symbol 2 are 548 $T_s$, the time length of the first GP is 138 $T_s$, and the time length of the second GP is 137 $T_s$.

When the sampling rate is 1920 kHz, a frame structure of each 1 ms subframe includes three (N=3) OFDM symbols with a subcarrier spacing of 3.75 kHz, where each OFDM symbol includes $FFT_{\Delta f1}$ symbol sampling points (a corresponding quantity of FFT points is $FFT_{\Delta f1}$) and a cyclic prefix including $CP_{\Delta f1}$ sampling points. Therefore, a time length occupied by the cyclic prefix is $CP_{\Delta f1} \times T_s$, and the OFDM symbol with a subcarrier spacing of 3.75 kHz corresponds to $(FFT_{\Delta f1}+CP_{\Delta f1})$ sampling points, and occupies a time of $(FFT_{\Delta f1}+CP_{\Delta f1}) \times T_s$.

Therefore, as shown in Table 4, in each 1 ms subframe, the zeroth OFDM symbol with a subcarrier spacing of 3.75 kHz includes 512 symbol sampling points and a cyclic prefix CP including 37 sampling points. Therefore, a symbol time length of the symbol 0 is 549 $T_s$. The first or the second OFDM symbol with a subcarrier spacing of 3.75 kHz includes 512 symbol sampling points and a cyclic prefix including 36 sampling points. Therefore, both a symbol time length of the symbol 1 and a symbol time length of the symbol 2 are 548 $T_s$. A length of a first GP of each 1 ms subframe is equal to a time length occupied by the first OFDM symbol with a subcarrier spacing of 15 kHz in each 1 ms subframe in LTE, that is, a time length corresponding to (128+10) sampling points, that is, $(128+10) \times T_s$. A length of a second GP of each 1 ms subframe is equal to a time length occupied by the last OFDM symbol with a subcarrier spacing of 15 kHz in each 1 ms subframe in the LTE, that is, a time length corresponding to (128+9) sampling points, that is, $(128+9) \times T_s$. $T_s$ is a time length corresponding to each sampling point, and is a reciprocal of the sampling rate.

It should be understood that FIG. 7 gives only an example of the embodiment of Table 4, and another arrangement manner of the OFDM symbols and the GP is not excluded in the present application.

It should be understood that a 1 ms subframe is defined for an NB IOT system. When a boundary of the 1 ms subframe is aligned with a boundary of an existing LTE subframe, it may be found that, when the NB-IOT system is deployed in an LTE system in an embedded manner, and an NB-IOT terminal sends a 3.75 kHz OFDM symbol, there is always no conflict with the last OFDM symbol, sent at the same time, with a subcarrier spacing of 15 kHz of each 1 ms subframe of an existing LTE terminal on a system frequency resource, thereby avoiding mutual interference with an SRS sent by the existing LTE terminal. In addition, a frame structure of the 1 ms subframe can carry three OFDM symbols with a subcarrier spacing of 3.75 kHz at most. Therefore, a design of the frame structure in a time unit of 1 ms is better.

It should be understood that, in the embodiments of the present application, sequence numbers of the foregoing OFDM symbols with a subcarrier spacing of 3.75 kHz are only used to distinguish different symbols, and do not impose any limitation on implementation of the embodiments of the present application.

Figure 8:
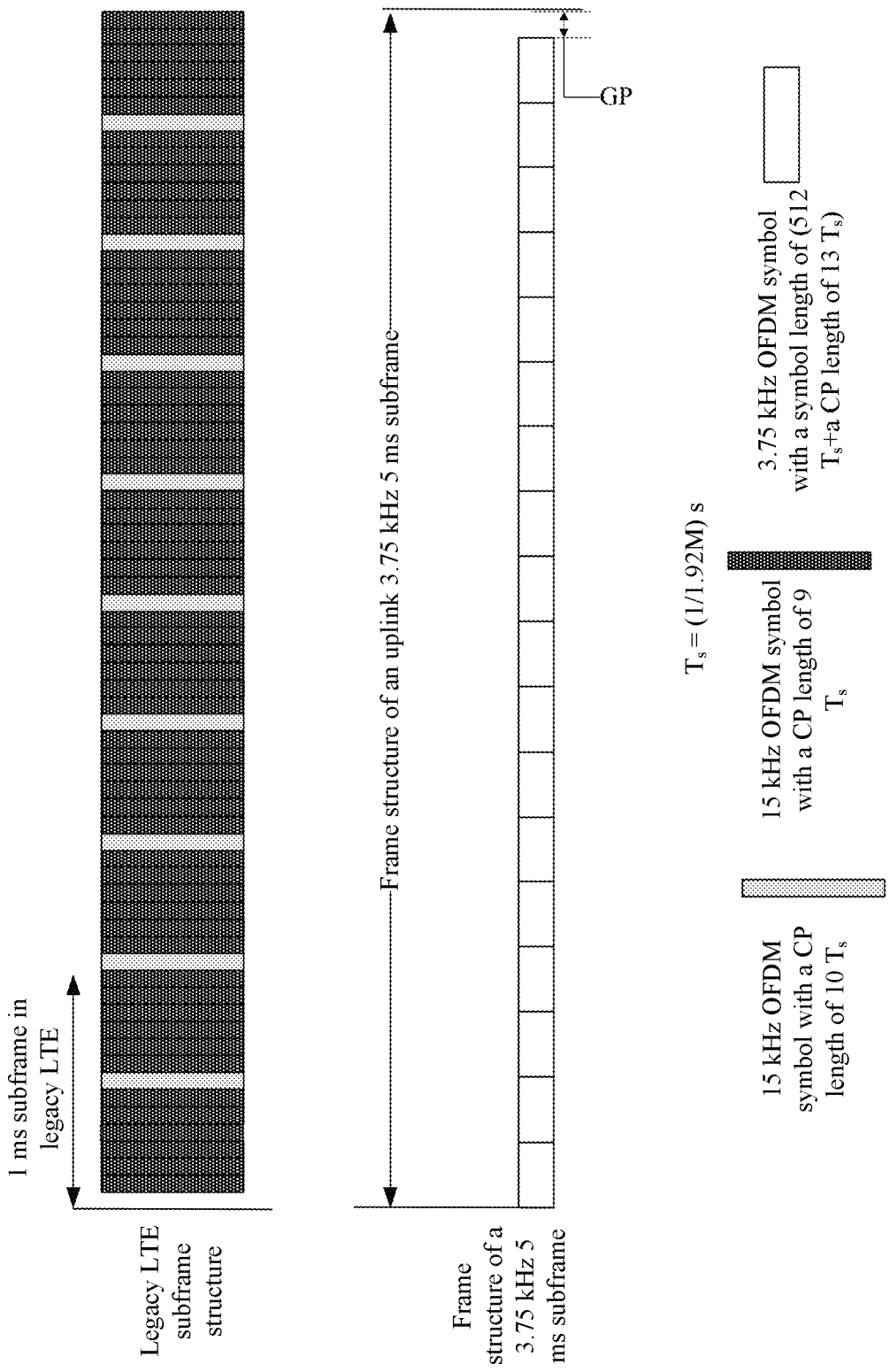
FIG. 8 is a schematic diagram of another frame structure of a 5 ms subframe according to an embodiment of the present application.

Optionally, a subframe structure in an embodiment of the present application may be shown in FIG. 8. FIG. 8 is a subframe structure for data transmission corresponding to another time unit according to an embodiment of the present application. The subframe structure may be applied to the application scenario shown in FIG. 2. In the scenario, the new system corresponds to an NB-IOT system, and a subcarrier spacing $\Delta f_1$ of the new system may be 3.75 kHz. The existing system corresponds to an existing LTE system, and a subcarrier spacing $\Delta f_2$ of the existing system may be 15 kHz. An NB-IOT terminal may use SC-FDMA transmission with a subcarrier spacing of 3.75 kHz on an uplink. In this case, the subframe structure shown in FIG. 8 may be used.

In the subframe structure in this embodiment of the present application, the time unit may be 5 ms, the time unit may be defined as a slot or a subframe, and the subframe structure includes 18 OFDM symbols with a subcarrier spacing of 3.75 kHz and a GP located behind the 18 OFDM symbols with a subcarrier spacing of 3.75 kHz, where a length of the GP may be greater than or equal to a time length occupied by one OFDM symbol with a subcarrier spacing of 15 kHz.

More specifically, parameters of the subframe structure shown in FIG. 8 may be shown in Table 5. A sampling rate corresponding to the structure parameters shown in Table 5 is 1.92 MHz. Correspondingly, a time length $T_s$ corresponding to each sampling point is a reciprocal of the sampling rate, that is, $T_s=(1/1.92\ M)s$.

It is understandable that, if a sampling rate of another numerical value is used, it is required to only perform equal proportion adjustment on a corresponding sampling point quantity in the table according to the sampling rate. To avoid repetition, no enumeration is made herein.

TABLE 5

| Time length (ms) | Frame structure | | | | Duration of a guard period (GP) |
|---|---|---|---|---|---|
| 5 | Structure of a symbol with a subcarrier spacing of 3.75 kHZ | | | | (128 + 22) $T_s$ |
| | $FFT_{\Delta f1}$ | $CP_{\Delta f1}$ | Length of an OFDM symbol | Quantity N of symbols | |
| | 512 | 13 | 525 $T_s$ | 18 | |

$FFT_{\Delta f1}$ represents a quantity of sampling points corresponding to a symbol sampling point part corresponding to each OFDM symbol with a subcarrier spacing of $\Delta f_1$, and $CP_{\Delta f1}$ represents a quantity of sampling points corresponding to a cyclic prefix CP part of each OFDM symbol with a subcarrier spacing of $\Delta f_1$. It can be known from a definition of an OFDM symbol that one OFDM symbol with a subcarrier spacing of $\Delta f_1$ includes $CP_{\Delta f1}$ CP sampling points and immediately following $FFT_{\Delta f1}$ symbol sampling points. Therefore, one OFDM symbol with a subcarrier spacing of $\Delta f_1$ totally includes $(FFT_{\Delta f1}+CP_{\Delta f1})$ sampling points, and corresponds to a time length of $(FFT_{\Delta f1}+CP_{\Delta f1}) \times T_s$.

More specifically, the subframe structure in a time unit of 5 ms shown in Table 5 may include OFDM symbols 0 to 17 with a subcarrier spacing of 3.75 kHz and a GP. The parameters for representing the foregoing OFDM symbols and the GP may include a quantity of FFT points, CP lengths of the OFDM symbols 0 to 17 with a subcarrier spacing of 3.75 kHz, symbol lengths of the OFDM symbols 0 to 17 with a subcarrier spacing of 3.75 kHz, a subframe time length, a time length of the GP, and so on.

When the sampling rate is 1920 kHz, a symbol sampling point part of each of the OFDM symbols 0 to 17 with a subcarrier spacing of 3.75 kHz corresponds to 512 sampling points (a corresponding quantity of $FFT_{\Delta f1}$ points is 512), a quantity of sampling points of each CP is 13, each symbol length is 525 $T_s$, and the length of the GP is equal to (128+22) $T_s$, which is greater than a time length occupied by one OFDM symbol with a subcarrier spacing of 15 kHz in LTE, where $T_s$ is a time length corresponding to each sampling point, and is a reciprocal of the sampling rate.

When the sampling rate is 1920 kHz, each 5 ms subframe includes 18 (N=18) OFDM symbols with a subcarrier spacing of 3.75 kHz, where each OFDM symbol includes $FFT_{\Delta f1}$ symbol sampling points (a corresponding quantity of FFT points is $FFT_{\Delta f1}$) and a cyclic prefix including $CP_{\Delta f1}$ sampling points. Therefore, a time length occupied by the cyclic prefix is $CP_{\Delta f1} \times T_s$, and the OFDM symbol with a subcarrier spacing of 3.75 kHz corresponds to ($FFT_{\Delta f1} + CP_{\Delta f1}$) sampling points, and occupies a time of ($FFT_{\Delta f1} + CP_{\Delta f1}) \times T_s$.

It should be understood that FIG. 8 gives only an example of the embodiment of Table 5, and another arrangement manner of the OFDM symbols and the GP is not excluded in the present application.

FIG. 5 gives a frame structure of a 2 ms subframe in this embodiment of the present application. It can be seen from the frame structure of the 2 ms subframe shown in FIG. 5 that, when a 2 ms subframe is used in an NB IOT system, and when a boundary of the 2 ms subframe of the NB IOT is aligned with a boundary of a 1 ms subframe in legacy LTE, a GP is set only at the end of the 2 ms subframe in a frame structure of the 2 ms subframe of the NB IOT, so as to ensure that only a channel sounding reference signal sent in the last subframe of every two subframes in the LTE system does not interfere with any one NB IOT OFDM symbol with a subcarrier spacing of 3.75 kHZ on a same frequency resource.

Therefore, on a network, a transmission mode (srs-SubframeConfig in LTE broadcast information) of a channel sounding reference signal in a cell needs to be appropriately configured, for example, it is configured that only the second subframe of two subframes is a subframe in which the channel sounding reference signal can be sent, to avoid interference between an NB IOT terminal and an SRS of an existing LTE terminal. That is, the frame structure of the 2 ms subframe in FIG. 5 has a limitation on a legacy LTE SRS configuration.

Figure 9:
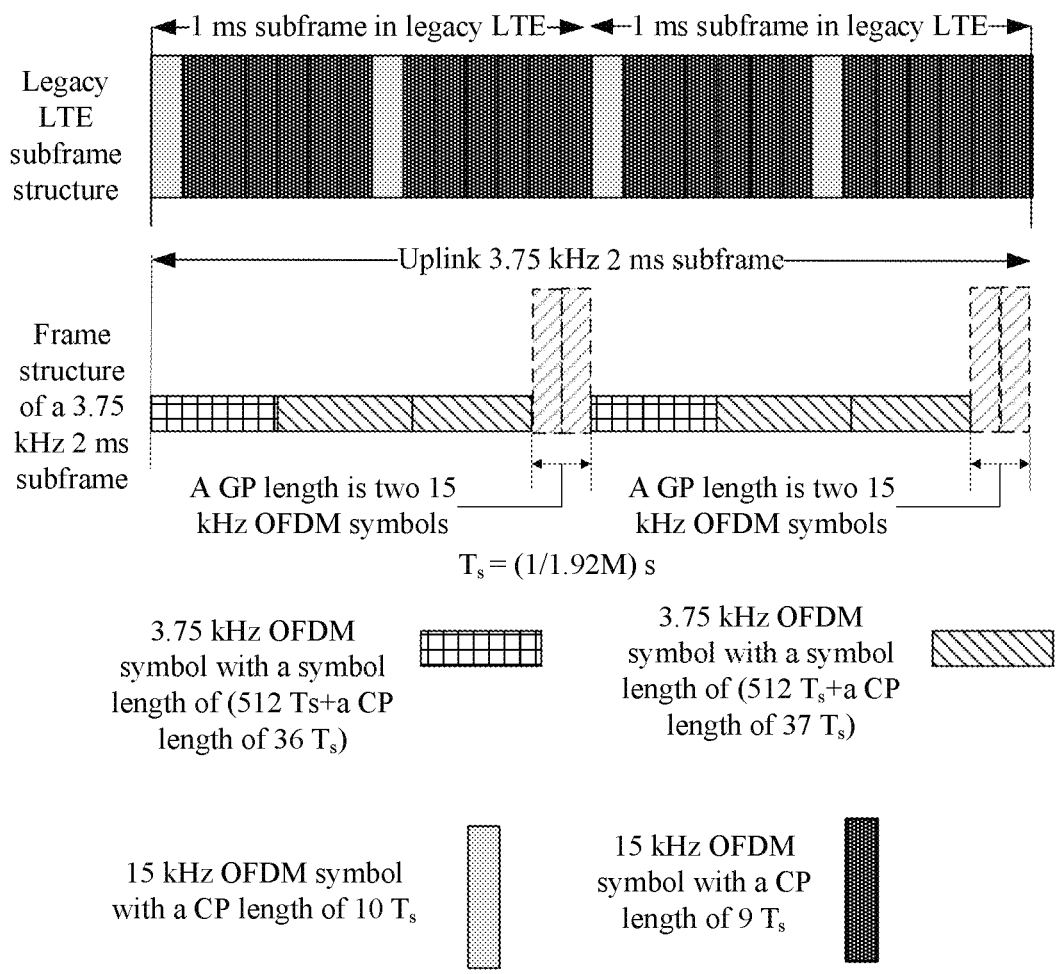
FIG. 9 is a schematic diagram of another frame structure of a 2 ms subframe according to an embodiment of the present application.

It should be understood that a method for resolving the foregoing SRS configuration limitation is to introduce a frame structure of a 2 ms subframe shown in FIG. 9 of the present application. The frame structure of the 2 ms subframe is designed by connecting two frame structures of a 1 ms subframe in FIG. 6 or FIG. 7 in series. Without loss of generality, a 2 ms subframe spliced by using two frame structures of the 1 ms subframe shown in FIG. 6 may be used as an example. Similarly, the frame structure of the 2 ms subframe may be spliced by using two frame structure of the 1 ms subframe shown in FIG. 7.

For a same time unit, by using the splicing method used in this embodiment, the frame structure may also be combined by frame structures corresponding to a time unit of smaller granularity.

Compared with the 2 ms subframe in FIG. 5, there are seven OFDM symbol resources in each 2 ms subframe, which is a maximum quantity of OFDM symbols with a subcarrier spacing of 3.75 kHz that can be carried in every 2 ms. Therefore, transmission efficiency of the NB IOT system is ensured. Compared with legacy LTE, resource efficiency of the NB IOT system is not decreased. When an NB-IOT system is embedded in a bandwidth of a legacy LTE system, because a conflict between SC-FDMA transmission with an uplink subcarrier spacing of 3.75 kHz and an SRS of a legacy LTE terminal needs to be avoided, there is a certain limitation on an SRS configuration of the LTE system.

Further, in the 2 ms subframe structure in FIG. 9, to prevent a limitation on an SRS transmission subframe configuration for an existing LTE system that is deployed in a co-existence manner, a GP is introduced to a frame structure of each 1 ms subframe. However, only six OFDM symbols with a subcarrier spacing of 3.75 kHz can be carried in a 2 ms subframe of this type of frame structure. Compared with the seven symbols that can be carried in the 2 ms subframe in FIG. 5, efficiency is decreased.

It should be understood that, relative to a quantity (three) of symbols with a subcarrier spacing of 3.75 kHZ that are carried in a frame structure of a 1 ms subframe, a quantity of symbols with a subcarrier spacing of 3.75 kHz that are carried in each 1 ms subframe of the frame structure of the 2 ms subframe shown in FIG. 9 is still a maximum quantity of symbols with a subcarrier spacing of 3.75 kHz that can be carried in the frame structure of a 1 ms subframe.

To provide configuration flexibility for an SRS subframe configuration of an LTE system that is deployed in a co-existence manner, while ensuring uplink transmission efficiency as far as possible, in the present application, two types of frame structures, which are a subframe type 1 (for example, the 2 ms subframe structure in FIG. 5) and a subframe type 2 (for example, the 2 ms subframe structure in FIG. 9), are defined separately by using a 2 ms subframe as an example. Transmission efficiency of the subframe type 1 is high, and seven OFDM symbols with a subcarrier spacing of 3.75 kHz are transmitted in each 2 ms subframe. However, there is a certain limitation on an SRS subframe pattern configuration of an LTE system that is deployed in a co-existence manner. For the subframe type 1, only interference from an SRS symbol in the second subframe of every two 1 ms subframes in the LTE system can be avoided. The subframe type 2 provides flexibility for the SRS subframe pattern configuration of the LTE system that is deployed in a co-existence manner, and may support the legacy LTE system that is deployed in a co-existence manner, to configure any 1 ms subframe as a subframe in which an SRS can be sent. However, transmission efficiency of the subframe type 2 is decreased, and only six OFDM symbols with a subcarrier spacing of 3.75 kHz can be transmitted in each 2 ms subframe.

Figure 10:
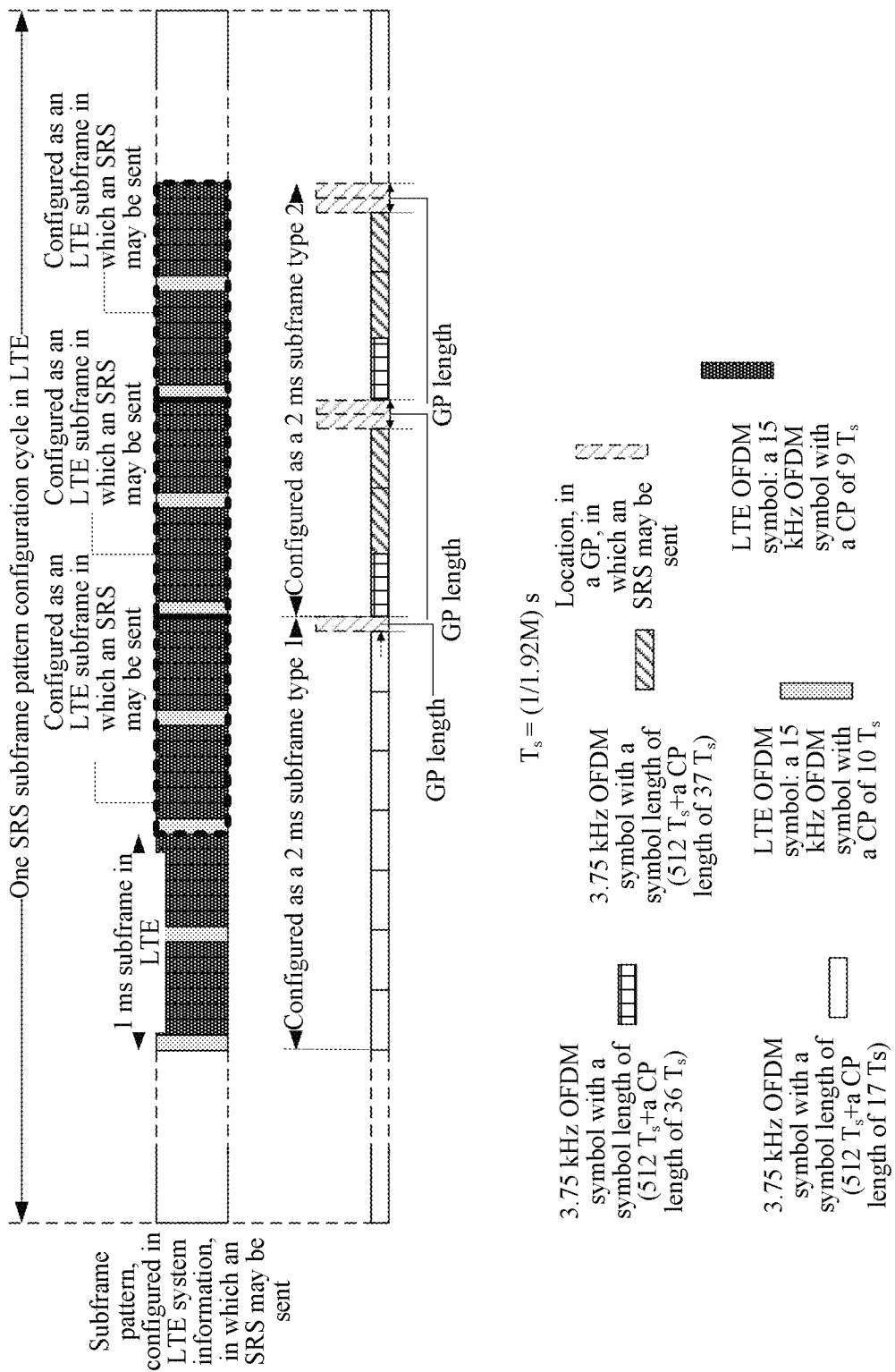
FIG. 10 is a schematic diagram of a configuration of a 2 ms subframe according to an embodiment of the present application.

Therefore, to provide configuration flexibility for an SRS subframe configuration of an LTE system that is deployed in a co-existence manner, while ensuring uplink transmission efficiency as far as possible, in an embodiment of the present application, a base station broadcasts, in system broadcast information of an NB-IOT system, configuration information about a subframe transmission mode of the time unit. As shown in FIG. 10, the configuration information indicates a subframe type transmission mode used when an NB-IOT terminal in a cell sends uplink information by using a subcarrier spacing of 3.75 kHz. A configuration of the subframe type transmission mode matches an SRS subframe pattern broadcast in the LTE system, so that when the first subframe of every two consecutive 1 ms LTE subframes may be used to send an SRS, the NB-IOT uses the subframe type 2 in a corresponding time. If the first subframe of every two consecutive 1 ms LTE subframes is not used to send an SRS, the NB-IOT uses the subframe type 1 in a corresponding time of two 1 ms.

It should be understood that, in the foregoing manner, an NB-IOT base station may configure the subframe type 1 for the NB-IOT system as far as possible, to implement higher transmission efficiency, and when interference from an SRS that may be sent in the first 1 ms LTE subframe of every two 1 ms LTE subframes needs to be avoided, the NB-IOT base station may configure the subframe type 2 for the NB-IOT system as far as possible.

Figure 11:
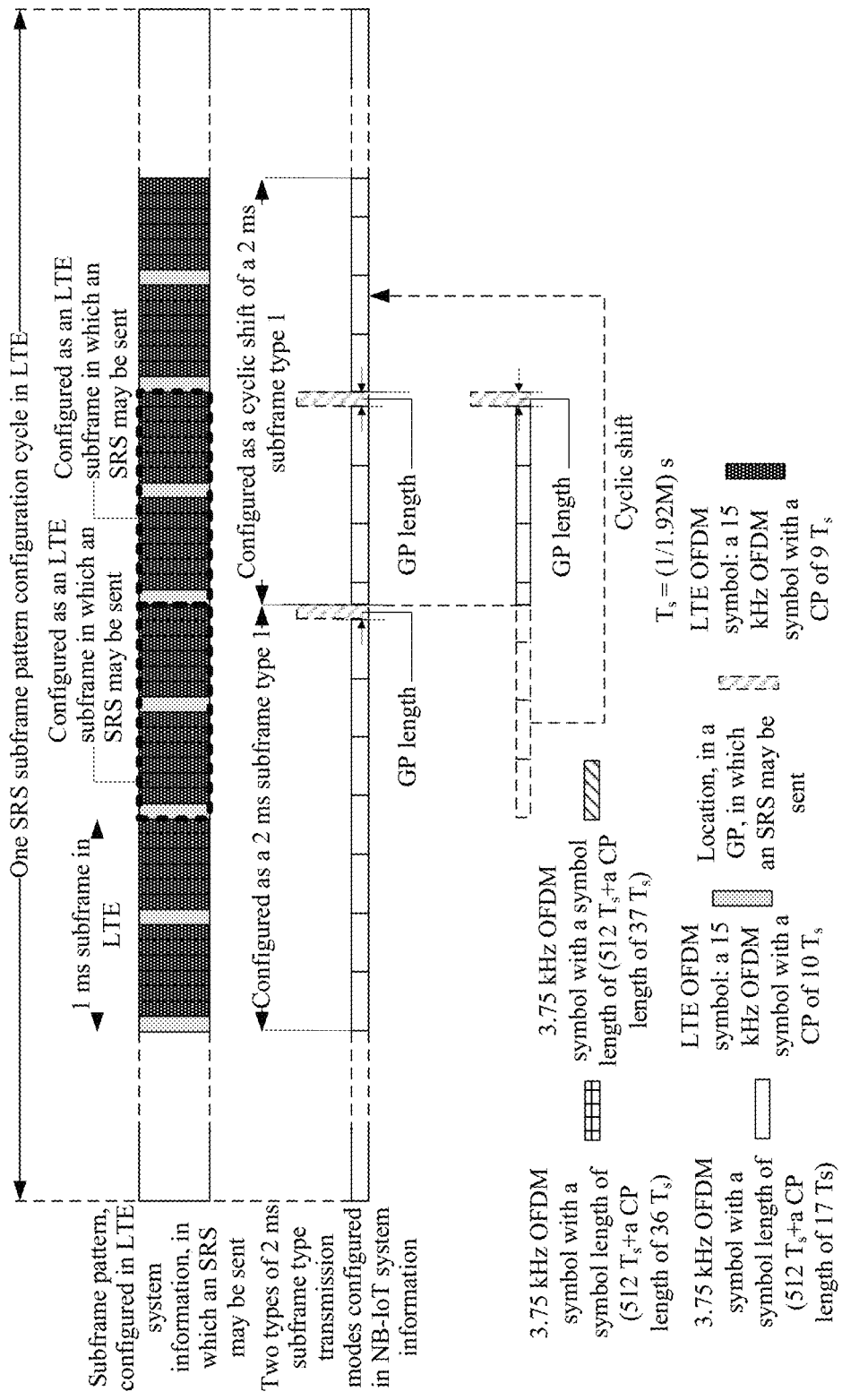
FIG. 11 is another schematic diagram of a configuration of a 2 ms subframe according to an embodiment of the present application.

To provide configuration flexibility for an SRS subframe configuration of an LTE system that is deployed in a co-existence manner, while ensuring uplink transmission efficiency as far as possible, in another embodiment of the present application, a base station broadcasts, in system broadcast information of an NB-IOT system, configuration information about a subframe transmission mode. As shown in FIG. 11, the configuration information indicates a 2 ms subframe type transmission sequence used when an NB-IOT terminal in a cell sends uplink information by using 3.75 kHz. In this embodiment, a configuration of the subframe type transmission mode matches an SRS subframe pattern broadcast in the LTE system.

It should be understood that, in this embodiment, subframe types of different types are defined by using a subframe in a time unit of 2 ms as an example, and an SRS subframe pattern configuration of the co-existing LTE system is flexibly supported by configuring the subframe type transmission mode. For a subframe of another time unit such as 1 ms or 5 ms, a similar configuration manner may be used.

It should be understood that, as shown in FIG. 11, in this embodiment of the present application, when only the first subframe of every two consecutive 1 ms LTE subframes may be used to send an SRS, and the second subframe is not used to send an SRS, the NB-IOT system still uses the 2 ms subframe type 1 in a corresponding time; and only a cyclic shift of the subframe is introduced, so that the GP is aligned with the last LTE OFDM symbol of the first 1 ms LTE subframe. If both the first subframe and the second subframe of every two consecutive 1 ms LTE subframes may be used to send an SRS, the NB-IOT system uses the 2 ms subframe type 2 in a corresponding time; if the first subframe of every two consecutive 1 ms LTE subframes is not used to send an SRS, the NB-IOT system uses the 2 ms subframe type 1 in a corresponding time of two 1 ms.

It should be understood that, in this manner, an NB-IOT base station may configure the 2 ms subframe type 1 for the NB-IOT system as far as possible, to implement higher transmission efficiency; and when an SRS that may be sent in the first 1 ms LTE subframe of every 1 ms LTE subframes needs to be avoided, the NB-IOT base station may configure the 2 ms subframe type 1 for the NB-IOT system as far as possible.

It should be understood that, as shown in FIG. 11, in this embodiment of the present application, because the cyclic shift is used for the 2 ms subframe type 1, for a middle OFDM symbol with a subcarrier spacing of 3.75 kHz of the subframe, sampling points of the middle OFDM symbol are split on two consecutive parts of one 2 ms subframe and are sent. Upon reception, the base station needs to perform operations such as FFT demodulation after collecting all the sampling points at the beginning and the end of the 2 ms subframe.

It should be understood that, in this embodiment, subframe types of different types are defined by using a subframe in a time unit of 2 ms as an example, and an SRS subframe pattern configuration of the co-existing LTE system is flexibly supported by configuring the subframe type transmission mode.

For the foregoing embodiment in which the configuration information about the subframe transmission mode of the time unit is broadcast by using the system information, the subframe type transmission mode, indicated by the configuration information and used when uplink information is sent by using 3.75 kHz, matches an SRS subframe pattern broadcast in the LTE system, so that transmission is performed according to the frame structure shown in FIG. 3 in each time unit of 2 ms (without loss of generality, it is assumed that each 2 ms is a slot). The configuration information of the subframe type transmission mode makes possible locations of as many LTE SRSs as possible overlap the GP in the frame structure shown in FIG. 3. Further, according to a transmission mode configuration of the LTE SRS, for an LTE SRS location that cannot overlap the GP part of the frame structure corresponding to the 2 ms slot, user equipment that performs transmission by using a subcarrier spacing of 3.75 kHz does not perform uplink transmission on a 3.75 kHz NB-IoT symbol overlapping with the LTE SRS, or does not send an uplink 3.75 kHz symbol on only a time location overlapping with the LTE SRS.

An SRS configuration of an LTE frame structure Type 1 is shown in Table 6:

TABLE 6

| srs-Sub-frameConfig | Binary | Transmission cycle $T_{SFC}$ (subframe) | Transmission offset $\Delta_{SFC}$ (subframe) | Subframe carrying an LTE SRS |
|---|---|---|---|---|
| 0 | 0000 | 1 | {0} | {0, 1, 2, 3, 4, 5, 6, 7, 8, 9} |
| 1 | 0001 | 2 | {0} | {0, 2, 4, 6, 8} |
| 2 | 0010 | 2 | {1} | {1, 3, 5, 7, 9} |
| 3 | 0011 | 5 | {0} | {0, 5} |
| 4 | 0100 | 5 | {1} | {1, 6} |
| 5 | 0101 | 5 | {2} | {2, 7} |
| 6 | 0110 | 5 | {3} | {3, 8} |
| 7 | 0111 | 5 | {0, 1} | {0, 1, 5, 6} |
| 8 | 1000 | 5 | {2, 3} | {2, 3, 7, 8} |
| 9 | 1001 | 10 | {0} | {0} |
| 10 | 1010 | 10 | {1} | {1} |
| 11 | 1011 | 10 | {2} | {2} |
| 12 | 1100 | 10 | {3} | {3} |
| 13 | 1101 | 10 | {0, 1, 2, 3, 4, 6, 8} | {0, 1, 2, 3, 4, 6, 8} |
| 14 | 1110 | 10 | {0, 1, 2, 3, 4, 5, 6, 8} | {0, 1, 2, 3, 4, 5, 6, 8} |
| 15 | 1111 | Reserved | Reserved | Reserved |

It should be understood that a method for resolving the foregoing SRS configuration limitation is to introduce a new superframe structure. The superframe structure herein refers to a combination manner, on a time domain, of the first frame structure described above, and may be referred to as a second time unit superframe structure. The second time unit superframe structure includes N first frame structures, where N is a positive integer. In design, a frame structure with a subcarrier spacing of 3.75 kHz in Table 7 is formed by the 2 ms subframe shown in FIG. 3. When an SRS transmission symbol overlaps an NB-IoT symbol, an NB-Slot symbol at the same moment is a blank symbol. The blank symbol herein refers to that no information, energy, or the like is transmitted on the symbol.

Figure 14:
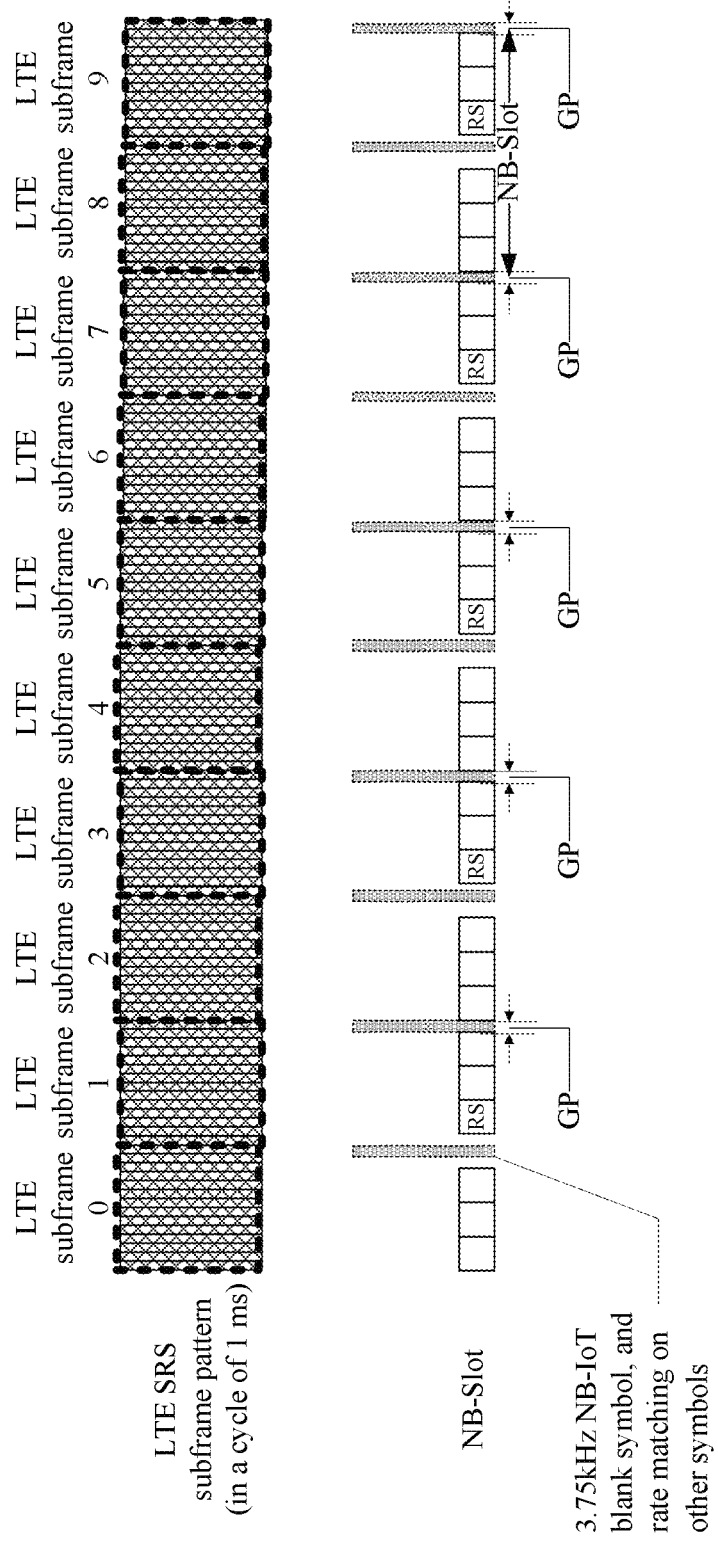
FIG. 14 is a superframe structure according to an embodiment of the present application.

In an embodiment, when srs-SubframeConfig is configured as '0', '13', '14', '7', or '8' on a network, an SRS is transmitted in each subframe or most subframes of an LTE radio frame. As shown in FIG. 14, a start boundary of each first frame structure (NB-Slot) is aligned with a start boundary of an even-numbered LTE subframe, and the fourth symbol of each first frame structure (NB-Slot, narrowband slot) is a blank symbol and is not used for transmission. One NB-Slot herein is formed by the 2 ms subframe shown in FIG. 3.

In an embodiment, when srs-SubframeConfig is configured as '1' on a network, that is, when an SRS transmission cycle is 2 ms, the SRS transmission cycle is consistent with a length of an NB-Slot, and a GP of the NB-Slot right overlaps an LTE SRS transmission symbol. An SRS is transmitted in an even-numbered subframe of an LTE radio frame. Therefore, a start boundary of a first frame structure (NB-Slot) is aligned with a start boundary of an even-numbered LTE subframe, and all symbols of each first frame structure (NB-Slot) are used for transmission. One NB-Slot herein is formed by the 2 ms subframe shown in FIG. 3.

In an embodiment, when srs-SubframeConfig is configured as '2' on a network, that is, when an SRS transmission cycle is 2 ms, the SRS transmission cycle is consistent with a length of an NB-Slot, and a GP of a first frame structure (NB-Slot) right overlaps an LTE SRS transmission symbol. An SRS is transmitted in an odd-numbered subframe of an LTE radio frame. Therefore, a start boundary of a first frame structure (NB-Slot) is aligned with a start boundary of an odd-numbered LTE subframe, and all symbols of each first frame structure (NB-Slot) are used for transmission. One NB-Slot herein is formed by the 2 ms subframe shown in FIG. 3.

In an embodiment, when srs-SubframeConfig is configured as '3' or '9' on a network, an SRS is transmitted in the first subframe and the sixth subframe of an LTE radio frame, a start boundary of the second time unit superframe structure is aligned with a start boundary of the second subframe of the LTE radio frame, a start boundary of each first frame structure (NB-Slot) is aligned with a start boundary of an odd-numbered LTE subframe, and the fourth symbol of the third first frame structure (NB-Slot) is a blank symbol and is not used for transmission. One first frame structure (NB-Slot) herein is formed by the 2 ms subframe shown in FIG. 3.

In an embodiment, when srs-SubframeConfig is configured as '9' on a network, an SRS is transmitted in the first subframe of an LTE radio frame, a start boundary of the second time unit superframe structure is aligned with a start boundary of the second subframe of the LTE radio frame, and a start boundary of each first frame structure (NB-Slot) is aligned with a start boundary of an odd-numbered LTE subframe. One first frame structure (NB-Slot) herein is formed by the 2 ms subframe shown in FIG. 3.

In an embodiment, when srs-SubframeConfig is configured as '4' or '10' on a network, an SRS is transmitted in the second subframe and the seventh subframe of an LTE radio frame, a start boundary of the second time unit superframe structure is aligned with a start boundary of the first subframe of the LTE radio frame, a start boundary of each first frame structure (NB-Slot) is aligned with a start boundary of an even-numbered LTE subframe, and the fourth symbol of the fourth first frame structure (NB-Slot) is a blank symbol and is not used for transmission. One first frame structure (NB-Slot) herein is formed by the 2 ms subframe shown in FIG. 3.

In an embodiment, when srs-SubframeConfig is configured as '10' on a network, an SRS is transmitted in the second subframe of an LTE radio frame, a start boundary of the second time unit superframe structure is aligned with a start boundary of the first subframe of the LTE radio frame, and a start boundary of each first frame structure (NB-Slot) is aligned with a start boundary of an even-numbered LTE subframe. One first frame structure (NB-Slot) herein is formed by the 2 ms subframe shown in FIG. 3.

In an embodiment, when srs-SubframeConfig is configured as '5' or '11' on a network, an SRS is transmitted in the third subframe and the eighth subframe of an LTE radio frame, a start boundary of the second time unit superframe structure is aligned with a start boundary of the second subframe of the LTE radio frame, a start boundary of each first frame structure (NB-Slot) is aligned with a start boundary of an odd-numbered LTE subframe, and the fourth symbol of the fourth first frame structure (NB-Slot) is a blank symbol and is not used for transmission. One first frame structure (NB-Slot) herein is formed by the 2 ms subframe shown in FIG. 3.

In an embodiment, when srs-SubframeConfig is configured as '11' on a network, an SRS is transmitted in the third subframe of an LTE radio frame, a start boundary of the second time unit superframe structure is aligned with a start boundary of the second subframe of the LTE radio frame, and a start boundary of each first frame structure (NB-Slot) is aligned with a start boundary of an odd-numbered LTE subframe. One first frame structure (NB-Slot) herein is formed by the 2 ms subframe shown in FIG. 3.

In an embodiment, when srs-SubframeConfig is configured as '6' or '12' on a network, an SRS is transmitted in the fourth subframe and the ninth subframe of an LTE radio frame. As shown in FIG. 14, a start boundary of the second time unit superframe structure is aligned with a start boundary of the first subframe of the LTE radio frame, a start boundary of each first frame structure (NB-Slot) is aligned with a start boundary of an even-numbered LTE subframe, and the fourth symbol of the fifth first frame structure (NB-Slot) is a blank symbol and is not used for transmission. One first frame structure (NB-Slot) herein is formed by the 2 ms subframe shown in FIG. 3.

In an embodiment, when srs-SubframeConfig is configured as '12' on a network, an SRS is transmitted in the fourth subframe of an LTE radio frame, a start boundary of the second time unit superframe structure is aligned with a start boundary of the first subframe of the LTE radio frame, and a start boundary of each first frame structure (NB-Slot) is aligned with a start boundary of an even-numbered LTE subframe. One first frame structure (NB-Slot) herein is formed by the 2 ms subframe shown in FIG. 3.

Optionally, in each first frame structure (NB-Slot), if there is a symbol that is a blank symbol and is not used for transmission, rate matching needs to be performed on data mapped onto the NB-Slot, and then the data is mapped onto remaining symbols of the NB-Slot.

Optionally, configuration information of the seven types of second time unit superframe structures in Table 7 is indicated by system information. The system information may be, for example, NB-IoT system information or LTE system information. The system information includes 3 bits, which represents eight types of indications. As shown in the first column of Table 7, '000' indicates an NB-IoT frame structure with an SRS configuration of '0', '13', '14', '7', or '8'. A specific frame structure is described in the foregoing embodiment, and details are not described herein. By analogy, as shown in the first column of Table 7, '001' to '110' respectively indicate other NB-IoT frame structures, and '111' is a reserved bit. In this embodiment, to reduce a quantity of bits broadcast in the system information, LTE SRS configurations #3 and #9 are combined. In this scenario, an NB-IoT terminal sends an uplink 3.75 kHz sub-carrier signal according to only a situation in which a quantity of unused NB-IoT symbols is greater. That is, as shown in the following figure, a situation of a related configuration 3 in NB-IoT system broadcast information may correspond to an LTE SRS configuration #3 or #9. In this case, NB-IoT information is sent according to the LTE SRS configuration #3. By analogy, a situation of a related configuration 4 in NB-IoT system broadcast information may correspond to LTE SRS configurations #4 and #10. In this case, NB-IoT information is sent according to the LTE SRS configuration #4. A situation of a related configuration 5 in NB-IoT system broadcast information may correspond to LTE SRS configurations #5 and #11. In this case, NB-IoT information is sent according to the LTE SRS configuration #5. A situation of a related configuration 6 in NB-IoT system broadcast information may correspond to LTE SRS configurations #6 and #12. In this case, NB-IoT information is sent according to the LTE SRS configuration #6. A situation of a related configuration 0 in NB-IoT system broadcast information may correspond to LTE SRS configurations #0, #13, #14, #7, and #8. In this case, NB-IoT information is sent according to the LTE SRS configuration #0.

Optionally, in this embodiment, to reduce a quantity of bits broadcast in the system information, LTE SRS configurations #0, #13, #14, #7, and #8 are combined. In this case, NB-IoT information is sent according to the LTE SRS configuration #0, LTE SRS configurations #1, #4, #6, #10, and #12 are combined. In this case, a start boundary of the second time unit superframe structure is aligned with a start boundary of the first subframe of an LTE radio frame, a start boundary of each first frame structure (NB-Slot) is aligned with a start boundary of an even-numbered LTE subframe, and the fourth symbol of each of the fourth and the fifth first frame structures (NB-Slot) is a blank symbol and is not used for transmission. One first frame structure (NB-Slot) herein is formed by the 2 ms subframe shown in FIG. 3. LTE SRS configurations #2, #3, #5, #9, and #11 are combined. In this case, a start boundary of the second time unit superframe structure is aligned with a start boundary of the second subframe of an LTE radio frame, a start boundary of each first frame structure (NB-Slot) is aligned with a start boundary of an odd-numbered LTE subframe, and the fourth symbol of each of the third and the fourth first frame structures (NB-Slot) is a blank symbol and is not used for transmission. The foregoing combination information may be indicated by 2 bit information in NB-IoT system information or LTE system information.

Optionally, the NB-IoT frame structure configuration information is indicated by system information. The system information may be, for example, NB-IoT system information or LTE system information. The system information includes 4 bits, which represents 16 types of indications. The 16 types of indications herein respectively correspond to 16 types of configurations of srs-SubframeConfig, and corresponding NB-IoT frame structures are described in the foregoing embodiment, and details are not described herein.

Optionally, a demodulation reference signal in an NB-IoT uplink subframe is transmitted on the third or the fifth symbol of each NB-Slot.

The frame structure with a subcarrier spacing of 15 kHz in Table 7 is similar to a legacy LTE frame structure. In this case, a symbol length in the NB-Slot is equal to a legacy LTE symbol. A boundary of the first NB-Slot is aligned with a boundary of the first LTE subframe, and the same applies to subsequent NB-Slots. On a symbol with SRS transmission configured on the network, an NB-Slot symbol at the same moment is not used for transmission.

| Configuration# regarding the field broadcasted in NB-IoT | Corresponding to LTE srs-SubframeConfig# | NB-IoT frame structure (for 3.75 kHz transmission) | NB-IoT frame structure (for 15 kHz transmission) |
|---|---|---|---|
| 0 | #0 (a cycle of 1 ms), #13, #14, #7, #8 | A start boundary of an NB-Slot is aligned with a boundary of an even-numbered LTE subframe. A middle symbol of each of all five NB-Slots is a blank symbol. | A start boundary of an NB-Slot #0 is aligned with a boundary of an LTE subframe #0. The last symbol of each 1 ms NB-IoT subframe is a blank symbol. |
| 1 | #1 (a cycle of 2 ms) | A start boundary of an NB-Slot is aligned with a boundary of an even-numbered LTE subframe. All NB-IoT symbols are used for transmission. | A start boundary of an NB-Slot #0 is aligned with a boundary of an LTE subframe #0. The last symbol of each of 1 ms NB-IoT subframes #0, #2, #4, #6, and #8 is a blank symbol. |
| 2 | #2 (a cycle of 2 ms) | A start boundary of an NB-Slot is aligned with a boundary of an odd-numbered LTE subframe. All NB-IoT symbols are used for transmission. | A start boundary of an NB-Slot #0 is aligned with a boundary of an LTE subframe #0. The last symbol of each of 1 ms NB-IoT subframes #1, #3, #5, #7, and #9 is a blank symbol. |
| 3 | #3 (a cycle of 5 ms), #9 (a cycle of 10 ms) | A start boundary of an NB-Slot #0 is aligned with a boundary of an LTE subframe #1. A middle symbol of an NB-Slot #2 is a blank symbol. | A start boundary of an NB-Slot #0 is aligned with a boundary of an LTE subframe #0. The last symbol of each of 1 ms NB-IoT subframes #0 and #5 is a blank symbol. |

-continued

| Configuration# regarding the field broadcasted in NB-IoT | Corresponding to LTE srs-SubframeConfig# | NB-IoT frame structure (for 3.75 kHz transmission) | NB-IoT frame structure (for 15 kHz transmission) |
|---|---|---|---|
| 4 | #4 (a cycle of 5 ms) #10 (a cycle of 10 ms) | A start boundary of an NB-Slot #0 is aligned with a boundary of an LTE subframe #0. A middle symbol of an NB-Slot #3 is a blank symbol. | A start boundary of an NB-Slot #0 is aligned with a boundary of an LTE subframe #0. The last symbol of each of 1 ms NB-IoT subframes #1 and #6 is a blank symbol. |
| 5 | #5 (a cycle of 5 ms) #11 (a cycle of 10 ms) | A start boundary of an NB-Slot #0 is aligned with a boundary of an LTE subframe #1. A middle symbol of an NB-Slot #3 is a blank symbol. | A start boundary of an NB-Slot #0 is aligned with a boundary of an LTE subframe #0. The last symbol of each of 1 ms NB-IoT subframes #2 and #7 is a blank symbol. |
| 6 | #6 (a cycle of 5 ms) #12 (a cycle of 10 ms) | A start boundary of an NB-Slot #0 is aligned with a boundary of an LTE subframe #0. A middle symbol of an NB-Slot #4 is a blank symbol. | A start boundary of an NB-Slot #0 is aligned with a boundary of an LTE subframe #0. The last symbol of each of 1 ms NB-IoT subframes #3 and #8 is a blank symbol. |
| 7 | reserved | No LTE SRS configured | No LTE SRS configured |

The foregoing describes in detail the frame structure for data transmission according to the embodiments of the present application with reference to FIG. 3 to FIG. 9, and the following describes a data transmission method according to an embodiment of the present application.

FIG. 12 is a flowchart of a data transmission method according to an embodiment of the present application. The method may be applied to the application scenario shown in FIG. 2. The method is executed by uplink UE with a subcarrier spacing is $\Delta f_1$, and the uplink user equipment may be first UE in an NB-IOT system.

S110. Determine a frame structure in a time unit, where the frame structure includes N OFDM symbols with a subcarrier spacing of $\Delta f_1$ and a GP, a length of the GP is greater than or equal to a time length occupied by one OFDM symbol with a subcarrier spacing of $\Delta f_2$, $\Delta f_1$ is unequal to $\Delta f_2$, and N is a positive integer.

S120. Send the OFDM symbols with a subcarrier spacing of $\Delta f_1$ according to the frame structure.

Specifically, in S110, when a time length of the time unit corresponding to the frame structure is $T_{time-unit}$, a value of N is a maximum quantity of orthogonal frequency division multiplexing OFDM symbols with a subcarrier spacing of $\Delta f_1$ that can be carried in the time unit $T_{time-unit}$ after the time that needs to be occupied by one OFDM symbol with a subcarrier spacing of $\Delta f_2$ is subtracted.

Optionally, that the first UE determines a frame structure in a time unit may be that the first UE determines the frame structure in the time unit according to scheduling of a base station. For example, for NB-IoT UE, the base station may indicate an uplink subcarrier spacing used by the UE when scheduling UE transmission, and a different subcarrier spacing corresponds to a different frame structure. Alternatively, that the first UE determines a frame structure in a time unit may be that the first UE determines, according to a configuration of a base station or a network, which frame structure is used in the time unit.

For example, when a time length of a time unit corresponding to the frame structure is $T_{time-unit}$, a value of N may be a greatest integer less than or equal to $[\Delta f1*(T_{time-unit} - T_{OFDM,\Delta f2})]$, where $T_{OFDM,\Delta f2}$ is the time length occupied by one OFDM symbol with a subcarrier spacing of $\Delta f_2$.

It should be understood that, after the N OFDM symbols with a subcarrier spacing of $\Delta f_1$ are subtracted from a time unit, a remaining time is a time occupied by the GP.

Optionally, the GP may be behind the N orthogonal frequency division multiplexing OFDM symbols with a subcarrier spacing of $\Delta f_1$, that is, the GP is at the end of the time unit.

It should be further understood that, in the time occupied by the GP, there may be at least one OFDM symbol, sent by second UE, with a subcarrier spacing of $\Delta f_2$.

It should be further understood that the first UE may be UE in the new system in FIG. 2, and the second UE may be existing UE of an existing system. The first UE may send an OFDM symbol of the new system, and because the second UE does not know existence of the new system, the second UE may send an OFDM symbol of the existing system in a resource allocated to the new system.

Therefore, according to the data transmission method in this embodiment of the present application, a frame structure in a time unit is designed, where the frame structure includes N OFDM symbols with a subcarrier spacing of $\Delta f_1$ and a GP, and a length of the GP is greater than or equal to a time length occupied by one OFDM symbol with a subcarrier spacing of $\Delta f_2$. When a new system is an NB-IOT system, and is deployed in an existing system (an LTE system) in an embedded manner, and when NB-IOT UE is sending data, resources can be adequately utilized, and a conflict with a legacy LTE SRS can be avoided.

Further, the first UE may be UE of the new system, and a subcarrier spacing of the UE may be 3.75 kHz, and the second UE may be existing LTE UE. The second UE may send an SRS on the last OFDM symbol of some 1 ms LTE subframes according to an LTE configuration.

It should be further understood that, according to an existing LTE stipulation, the second UE may send an SRS over a full bandwidth in a time sharing manner according to the full bandwidth or according to a frequency hopping pattern. Therefore, when the second UE sends an SRS in a frequency resource of the new system, the SRS may conflict with a symbol sent by the first UE, which causes mutual interference.

Therefore, according to the data transmission method in this embodiment of the present application, the first UE does not send, in the GP, an OFDM symbol with a subcarrier spacing of $\Delta f_1$, and the GP is greater than or equal to a length of one existing LTE OFDM symbol, thereby avoiding interference of an OFDM symbol with a subcarrier spacing of $\Delta f_2$ (for example, an SRS symbol) sent by the first UE and the second UE in the time of the GP.

In the data transmission method of this embodiment, optionally, the new system corresponds to an NB-IOT system, SC-FDMA transmission may be used on an uplink, and a subcarrier spacing $\Delta f_1$ of the new system may be 3.75 kHz. The existing system corresponds to an existing LTE system, and a subcarrier spacing $\Delta f_2$ of the existing system may be 15 kHz.

Optionally, a frame structure of a 2 ms subframe may include seven OFDM symbols with a subcarrier spacing of 3.75 kHz and a GP, where a length of the GP may be greater than or equal to a time length occupied by one OFDM symbol with a subcarrier spacing of 15 kHz.

It should be understood that the frame structure of the 2 ms subframe in the NB-IOT may be shown in FIG. 5, and the frame structure may include seven OFDM symbols with a subcarrier spacing of 3.75 kHz and a GP located behind the seven OFDM symbols with a subcarrier spacing of 3.75 kHz, where a length of the GP may be equal to a time length occupied by one OFDM symbol with a subcarrier spacing of 15 kHz.

More specifically, parameters of the 2 ms subframe may be shown in Table 1, and details are not described herein.

Therefore, according to the data transmission method in this embodiment of the present application, a frame structure in a time unit is designed, where the frame structure includes N OFDM symbols with a subcarrier spacing of $\Delta f_1$ and a GP, and a length of the GP is greater than or equal to a time length occupied by one OFDM symbol with a subcarrier spacing of $\Delta f_2$. Therefore, when an NB-IOT system is deployed in an LTE system in an embedded manner, and when NB-IOT UE is sending data, a conflict with a legacy LTE SRS can always be avoided, and time-frequency resources can be adequately utilized.

In the data transmission method of this embodiment, optionally, the new system corresponds to an NB-IOT system, SC-FDMA transmission may be used on an uplink, and a subcarrier spacing $\Delta f_1$ of the new system may be 3.75 kHz. The existing system corresponds to an existing LTE system, and a subcarrier spacing $\Delta f_2$ of the existing system may be 15 kHz.

Optionally, a frame structure of a 1 ms subframe includes three OFDM symbols with a subcarrier spacing of 3.75 kHz and a GP located behind the three OFDM symbols with a subcarrier spacing of 3.75 kHz, where a length of the GP may be a time length occupied by two OFDM symbols with a subcarrier spacing of 15 kHz.

It should be understood that, in the NB-IOT, the frame structure of the 1 ms subframe may be shown in FIG. 6, and the frame structure may include three OFDM symbols with a subcarrier spacing of 3.75 kHz and a GP located behind the three OFDM symbols with a subcarrier spacing of 3.75 kHz, where a length of the GP may be equal to a time length occupied by two OFDM symbols with a subcarrier spacing of 15 kHz.

More specifically, parameters of the 1 ms subframe may be shown in Table 3, and details are not described herein.

Therefore, according to the data transmission method in this embodiment of the present application, a frame structure in a time unit is designed, where the frame structure includes N OFDM symbols with a subcarrier spacing of $\Delta f_1$ and a GP, and a length of the GP is greater than or equal to a time length occupied by one OFDM symbol with a subcarrier spacing of $\Delta f_2$. Therefore, when an NB-IOT system is deployed in an LTE system in an embedded manner, and when NB-IOT UE is sending data, a conflict with a legacy LTE SRS can always be avoided, and time-frequency resources can be adequately utilized.

In the data transmission method of this embodiment, optionally, the new system corresponds to an NB-IOT system, SC-FDMA transmission may be used on an uplink, and a subcarrier spacing $\Delta f_1$ of the new system may be 3.75 kHz. The existing system corresponds to an existing LTE system, and a subcarrier spacing $\Delta f_2$ of the existing system may be 15 kHz.

Optionally, a frame structure of a 1 ms subframe includes three OFDM symbols with a subcarrier spacing of 3.75 kHz, a first GP, and a second GP.

It should be understood that, in the NB-IOT, the frame structure of the 1 ms subframe may be shown in FIG. 7, and the frame structure may include three OFDM symbols with a subcarrier spacing of 3.75 kHz, a first GP, and a second GP, where both the first GP and the second GP are a time length occupied by one OFDM symbol with a subcarrier spacing of 15 kHz, the first GP is located in front of the three OFDM symbols with a subcarrier spacing of 3.75 kHz, and the second GP is located behind the three OFDM symbols with a subcarrier spacing of 3.75 kHz.

More specifically, parameters of the 1 ms subframe may be shown in Table 4, and details are not described herein.

In the data transmission method of this embodiment, optionally, the new system corresponds to an NB-IOT system, SC-FDMA transmission may be used on an uplink, and a subcarrier spacing $\Delta f_1$ of the new system may be 3.75 kHz. The existing system corresponds to an existing LTE system, and a subcarrier spacing $\Delta f_2$ of the existing system may be 15 kHz. In this embodiment, a design of a frame structure of a 2 ms subframe is provided, for example, a frame structure of a 2 ms subframe shown in FIG. 9. The frame structure of the 2 ms subframe may be designed by connecting two frame structures of a 1 ms subframe in FIG. 6 or FIG. 7 in series. Optionally, a 2 ms subframe spliced by using two frame structures of the 1 ms subframe shown in FIG. 6 may be used as an example. The 2 ms subframe may also be spliced by using two 1 ms subframes shown in FIG. 7.

It should be understood that one to two OFDM symbols with a subcarrier spacing of 15 kHz are reserved in each uplink frame structure with a subcarrier spacing of 3.75 kHz, and may be used to avoid a conflict with the legacy LTE SRS. However, if the base station knows that no user equipment sends an SRS on a TTI on a physical resource module (PRB) on which an NB-IOT physical resource is located, the base station may schedule uplink NB-IOT UE (that is, third UE) with a subcarrier spacing of 15 kHz to send one to two symbols with a subcarrier spacing of 15 kHz to the base station in the time of the GP, to carry uplink data, a pilot signal, or the like of the third UE.

Optionally, when the time of the GP does not include an uplink SRS sent by the second UE, the GP may be used to send an OFDM symbol with a subcarrier spacing of $\Delta f_2$ by the third UE.

For example, for the GP in the 1 ms subframe, if no legacy LTE UE sends an SRS in a transmission time spacing, the base station may instruct next scheduled uplink UE with an uplink multi-subcarrier or single-carrier subcarrier spacing of 15 kHz to carry uplink data of the uplink UE with a subcarrier spacing of 15 kHz by using a time-frequency resource of the GP in the 1 ms subframe.

It should be understood that the base station may send an indication message by using a physical downlink control channel (PDCCH), where the indication message may instruct NB-IOT user equipment with a subcarrier spacing of 15 kHz to carry data by using a time-frequency resource of the GP when sending the data to the base station.

Therefore, according to the data transmission method in this embodiment of the present application, a frame structure in a time unit is designed, where the frame structure includes N orthogonal frequency division multiplexing OFDM symbols with a subcarrier spacing of $\Delta f_1$ and a guard period GP, and a length of the GP is greater than or equal to a time length occupied by one OFDM symbol with a subcarrier spacing of $\Delta f_2$. Therefore, when an NB-IOT system is deployed in an LTE system in an embedded manner, and when NB-IOT UE is sending data, a resource of the legacy LTE system can be adequately utilized, and a conflict with a legacy LTE SRS can be avoided.

It should be understood that one to two OFDM symbols with a subcarrier spacing of 15 kHz are reserved in each uplink frame structure with a subcarrier spacing of 3.75 kHz, which may be a first GP or a second GP or a GP, and may be used to avoid a conflict with the legacy LTE SRS. However, if the base station knows that no SRS is sent on an LTE frame structure on a PRB on which an NB-IOT physical resource is located, the base station may schedule uplink NB-IOT user equipment with a subcarrier spacing of 15 kHz to use one to two spare OFDM symbols with a subcarrier spacing of 15 kHz in a frame structure of uplink user equipment with a subcarrier spacing of 3.75 kHz when sending data to the base station, that is, may adequately utilize the first GP or the second GP or the GP of an uplink with an NB-IOT 3.75 Hz subcarrier spacing to carry information of the uplink NB-IOT user equipment with a subcarrier spacing of 15 kHz.

For example, the 1 ms subframe in FIG. 7 may include a first GP and a second GP, and if no legacy LTE user equipment sends an SRS on a frequency resource occupied by the NB IOT UE in the 1 ms time unit, the base station may instruct another user equipment to send a symbol with an uplink multi-subcarrier or single-carrier subcarrier spacing of 15 kHz, to carry uplink data of the uplink user equipment.

It should be understood that the base station may send an indication message by using a PDCCH, where the indication message may instruct an NB-IOT user equipment with a subcarrier spacing of 15 kHz to carry data by using the first GP and/or the second GP when sending the data to the base station.

Therefore, according to the data transmission method in this embodiment of the present application, a frame structure in a time unit is designed, where the frame structure includes N orthogonal frequency division multiplexing OFDM symbols with a subcarrier spacing of $\Delta f_1$ and a guard period GP, and a length of the GP is greater than or equal to a time length occupied by one OFDM symbol with a subcarrier spacing of $\Delta f_2$. Therefore, when an NB-IOT system is deployed in an LTE system in an embedded manner, and when NB-IOT UE is sending data, a resource of the legacy LTE system can be adequately utilized, and a conflict with a legacy LTE SRS can be avoided.

Figure 15:
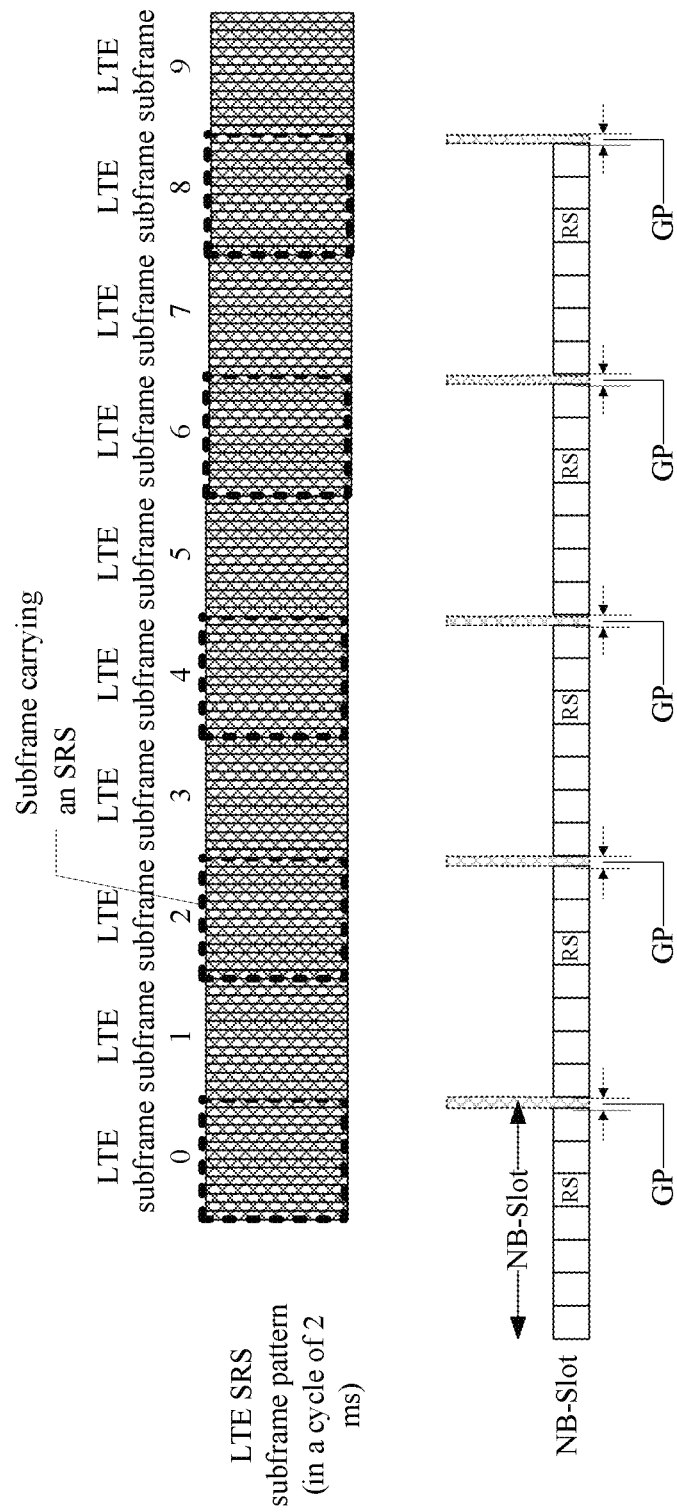
FIG. 15 is another superframe structure according to an embodiment of the present application.
Figure 16:
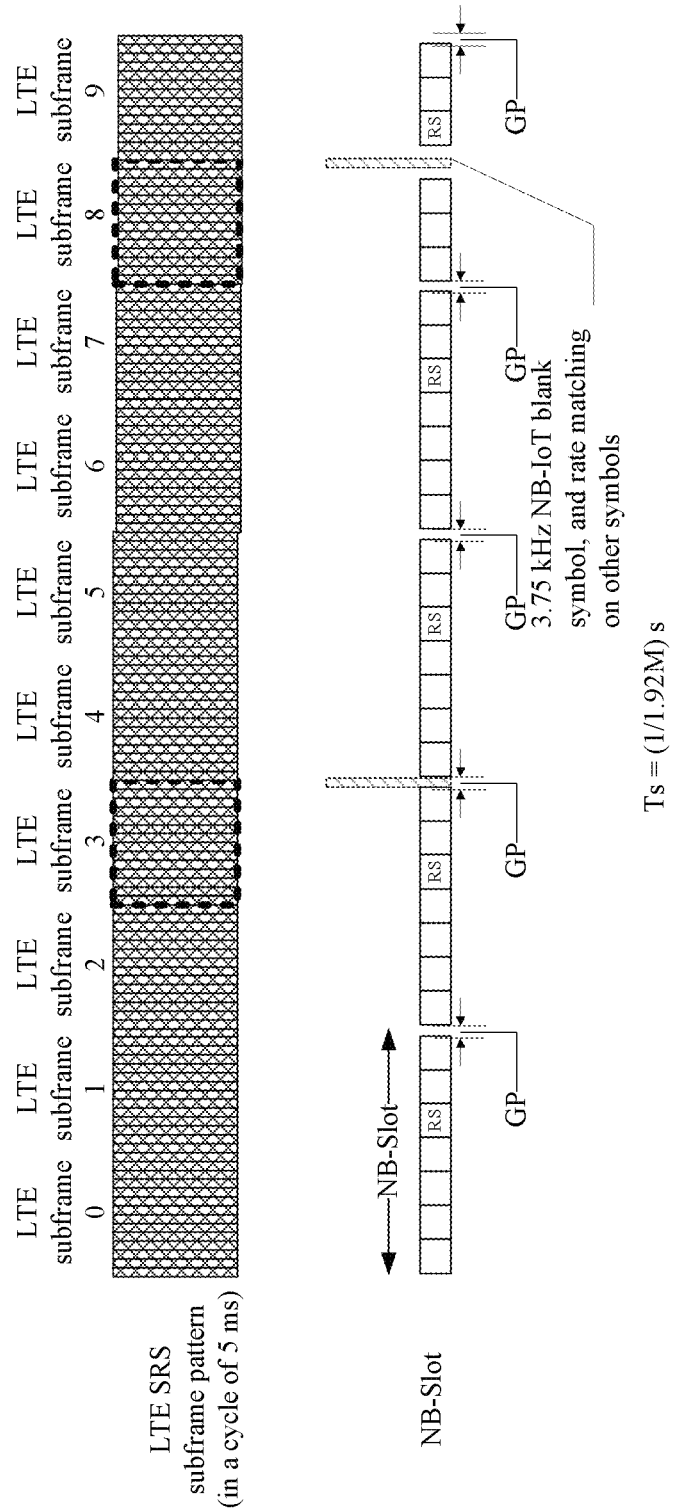
FIG. 16 is still another superframe structure according to an embodiment of the present application.

Based on new superframe structures provided in FIG. 14 to FIG. 16, an embodiment of the present application provides another data transmission method, including:

determining a superframe structure in a second time unit, where the superframe structure includes N first frame structures, and N is a positive integer; and sending an OFDM symbol with a subcarrier spacing of $\Delta f_1$ according to the frame structure.

Specifically, when a channel sounding reference signal (SRS, Sounding Reference Signal) subframe configuration item srs-SubframeConfig is configured as '0', '13', '14', '7', or '8' on a network, an SRS is transmitted in each subframe or most subframes of an LTE radio frame. As shown in FIG. 14, a start boundary of each first frame structure (NB-Slot) is aligned with a start boundary of an even-numbered LTE subframe, and the fourth symbol of each first frame structure (NB-Slot, narrowband slot) is a blank symbol and is not used for transmission. One NB-Slot herein is formed by the 2 ms subframe shown in FIG. 3.

When srs-SubframeConfig is configured as '1' on a network, that is, when an SRS transmission cycle is 2 ms, the SRS transmission cycle is consistent with a length of an NB-Slot, and a GP of the NB-Slot right overlaps an LTE SRS transmission symbol. An SRS is transmitted in an even-numbered subframe of an LTE radio frame. Therefore, a start boundary of a first frame structure (NB-Slot) is aligned with a start boundary of an even-numbered LTE subframe, and all symbols of each first frame structure (NB-Slot) are used for transmission. One NB-Slot herein is formed by the 2 ms subframe shown in FIG. 3.

When srs-SubframeConfig is configured as '2' on a network, that is, when an SRS transmission cycle is 2 ms, the SRS transmission cycle is consistent with a length of an NB-Slot, and a GP of a first frame structure (NB-Slot) right overlaps an LTE SRS transmission symbol. An SRS is transmitted in an odd-numbered subframe of an LTE radio frame. Therefore, a start boundary of a first frame structure (NB-Slot) is aligned with a start boundary of an odd-numbered LTE subframe, and all symbols of each first frame structure (NB-Slot) are used for transmission. One NB-Slot herein is formed by the 2 ms subframe shown in FIG. 3.

When srs-SubframeConfig is configured as '3' or '9' on a network, an SRS is transmitted in the first subframe and the sixth subframe of an LTE radio frame, a start boundary of the second time unit superframe structure is aligned with a start boundary of the second subframe of the LTE radio frame, a start boundary of each first frame structure (NB-Slot) is aligned with a start boundary of an odd-numbered LTE subframe, and the fourth symbol of the third first frame structure (NB-Slot) is a blank symbol and is not used for transmission. One first frame structure (NB-Slot) herein is formed by the 2 ms subframe shown in FIG. 3.

When srs-SubframeConfig is configured as '9' on a network, an SRS is transmitted in the first subframe of an LTE radio frame, a start boundary of the second time unit superframe structure is aligned with a start boundary of the second subframe of the LTE radio frame, and a start boundary of each first frame structure (NB-Slot) is aligned with a start boundary of an odd-numbered LTE subframe. One first frame structure (NB-Slot) herein is formed by the 2 ms subframe shown in FIG. 3.

When srs-SubframeConfig is configured as '4' or '10' on a network, an SRS is transmitted in the second subframe and the seventh subframe of an LTE radio frame, a start boundary of the second time unit superframe structure is aligned with a start boundary of the first subframe of the LTE radio frame, a start boundary of each first frame structure (NB-Slot) is aligned with a start boundary of an even-numbered LTE subframe, and the fourth symbol of the fourth first frame structure (NB-Slot) is a blank symbol and is not used for transmission. One first frame structure (NB-Slot) herein is formed by the 2 ms subframe shown in FIG. 3.

When srs-SubframeConfig is configured as '10' on a network, an SRS is transmitted in the second subframe of an LTE radio frame, a start boundary of the second time unit superframe structure is aligned with a start boundary of the first subframe of the LTE radio frame, and a start boundary of each first frame structure (NB-Slot) is aligned with a start boundary of an even-numbered LTE subframe. One first frame structure (NB-Slot) herein is formed by the 2 ms subframe shown in FIG. 3.

When srs-SubframeConfig is configured as '5' or '11' on a network, an SRS is transmitted in the third subframe and the eighth subframe of an LTE radio frame, a start boundary of the second time unit superframe structure is aligned with a start boundary of the second subframe of the LTE radio frame, a start boundary of each first frame structure (NB-Slot) is aligned with a start boundary of an odd-numbered LTE subframe, and the fourth symbol of the fourth first frame structure (NB-Slot) is a blank symbol and is not used for transmission. One first frame structure (NB-Slot) herein is formed by the 2 ms subframe shown in FIG. 3.

When srs-SubframeConfig is configured as '11' on a network, an SRS is transmitted in the third subframe of an LTE radio frame, a start boundary of the second time unit superframe structure is aligned with a start boundary of the second subframe of the LTE radio frame, and a start boundary of each first frame structure (NB-Slot) is aligned with a start boundary of an odd-numbered LTE subframe. One first frame structure (NB-Slot) herein is formed by the 2 ms subframe shown in FIG. 3.

When srs-SubframeConfig is configured as '6' or '12' on a network, an SRS is transmitted in the fourth subframe and the ninth subframe of an LTE radio frame. As shown in FIG. 14, a start boundary of the second time unit superframe structure is aligned with a start boundary of the first subframe of the LTE radio frame, a start boundary of each first frame structure (NB-Slot) is aligned with a start boundary of an even-numbered LTE subframe, and the fourth symbol of the fifth first frame structure (NB-Slot) is a blank symbol and is not used for transmission. One first frame structure (NB-Slot) herein is formed by the 2 ms subframe shown in FIG. 3.

When srs-SubframeConfig is configured as '12' on a network, an SRS is transmitted in the fourth subframe of an LTE radio frame, a start boundary of the second time unit superframe structure is aligned with a start boundary of the first subframe of the LTE radio frame, and a start boundary of each first frame structure (NB-Slot) is aligned with a start boundary of an even-numbered LTE subframe. One first frame structure (NB-Slot) herein is formed by the 2 ms subframe shown in FIG. 3.

Optionally, in each first frame structure (NB-Slot), if there is a symbol that is a blank symbol and is not used for transmission, rate matching needs to be performed on data mapped onto the NB-Slot, and then the data is mapped onto remaining symbols of the NB-Slot.

Optionally, configuration information of the seven types of second time unit superframe structures in Table 7 is indicated by system information. The system information may be, for example, NB-IoT system information or LTE system information. The system information includes 3 bits, which represents eight types of indications. As shown in the first column of Table 7, '000' indicates an NB-IoT frame structure with an SRS configuration of '0', '13', '14', '7', or '8'. A specific frame structure is described in the foregoing embodiment, and details are not described herein. By analogy, as shown in the first column of Table 7, '001' to '110' respectively indicate other NB-IoT frame structures, and '111' is a reserved bit. In this embodiment, to reduce a quantity of bits broadcast in the system information, LTE SRS configurations #3 and #9 are combined. In this scenario, an NB-IoT terminal sends an uplink 3.75 kHz subcarrier signal according to only a situation in which a quantity of unused NB-IoT symbols is greater. That is, as shown in the following figure, a situation of a related configuration 3 in NB-IoT system broadcast information may correspond to an LTE SRS configuration #3 or #9. In this case, NB-IoT information is sent according to the LTE SRS configuration #3. By analogy, a situation of a related configuration 4 in NB-IoT system broadcast information may correspond to LTE SRS configurations #4 and #10. In this case, NB-IoT information is sent according to the LTE SRS configuration #4. A situation of a related configuration 5 in NB-IoT system broadcast information may correspond to LTE SRS configurations #5 and #11. In this case, NB-IoT information is sent according to the LTE SRS configuration #5. A situation of a related configuration 6 in NB-IoT system broadcast information may correspond to LTE SRS configurations #6 and #12. In this case, NB-IoT information is sent according to the LTE SRS configuration #6. A situation of a related configuration 0 in NB-IoT system broadcast information may correspond to LTE SRS configurations #0, #13, #14, #7, and #8. In this case, NB-IoT information is sent according to the LTE SRS configuration #0.

Optionally, to reduce a quantity of bits broadcast in the system information, LTE SRS configurations #0, #13, #14, #7, and #8 are combined. In this case, NB-IoT information is sent according to the LTE SRS configuration #0. LTE SRS configurations #1, #4, #6, #10, and #12 are combined. In this case, a start boundary of the second time unit superframe structure is aligned with a start boundary of the first subframe of an LTE radio frame, a start boundary of each first frame structure (NB-Slot) is aligned with a start boundary of an even-numbered LTE subframe, and the fourth symbol of each of the fourth and the fifth first frame structures (NB-Slot) is a blank symbol and is not used for transmission. One first frame structure (NB-Slot) herein is formed by the 2 ms subframe shown in FIG. 3. LTE SRS configurations #2, #3, #5, #9, and #11 are combined. In this case, a start boundary of the second time unit superframe structure is aligned with a start boundary of the second subframe of an LTE radio frame, a start boundary of each first frame structure (NB-Slot) is aligned with a start boundary of an odd-numbered LTE subframe, and the fourth symbol of each of the third and the fourth first frame structures (NB-Slot) is a blank symbol and is not used for transmission. The foregoing combination information may be indicated by 2 bit information in NB-IoT system information or LTE system information.

Optionally, the NB-IoT frame structure configuration information is indicated by system information. The system information may be, for example, NB-IoT system information or LTE system information. The system information includes 4 bits, which represents 16 types of indications. The 16 types of indications herein respectively correspond to 16 types of configurations of srs-SubframeConfig, and corresponding NB-IoT frame structures are described in the foregoing embodiment, and details are not described herein.

Optionally, a demodulation reference signal in an NB-IoT uplink subframe is transmitted on the third or the fifth symbol of each NB-Slot.

The frame structure with a subcarrier spacing of 15 kHz in Table 7 is similar to a legacy LTE frame structure. In this case, a symbol length in the NB-Slot is equal to a legacy LTE symbol. A boundary of the first NB-Slot is aligned with a boundary of the first LTE subframe, and the same applies to subsequent NB-Slots. On a symbol with SRS transmission configured on the network, an NB-Slot symbol at the same moment is not used for transmission.

The foregoing describes in detail the data transmission method and the frame structure according to the embodiments of the present application with reference to FIG. 1 to FIG. 12, and the following describes data transmission user equipment according to an embodiment of the present application.

FIG. 13 is a structural block diagram of user equipment according to an embodiment of the present application. The user equipment 100 shown in FIG. 13 includes a processor 110 and a transmitter 120.

The processor 110 is configured to determine a frame structure in a time unit, where the frame structure includes N orthogonal frequency division multiplexing OFDM symbols with a subcarrier spacing of $\Delta f_1$ and a guard period GP, a length of the GP is greater than or equal to a time length occupied by one OFDM symbol with a subcarrier spacing of $\Delta f_2$, $\Delta f_1$ is unequal to $\Delta f_2$, and N is a positive integer.

The processor 110 is further configured to determine a superframe structure in a second time unit, where the superframe structure includes N first frame structures, and N is a positive integer.

The transmitter 120 is configured to send the OFDM symbols with a subcarrier spacing of $\Delta f_1$ according to the frame structure.

In addition, the user equipment 100 may further include a memory 130 coupled to the processor 110, where the memory 130 may be configured to store an instruction, and may further be configured to store the frame structure and the like. The processor 110 may be a baseband processor, a communications processor, a digital signal processor, an application-specific integrated circuit, or the like. The processor 110 is configured to execute the instruction stored in the memory 130.

It should be understood that the transmitter 120, the processor 110, the memory 130, and the like in the user equipment 100 may be connected to each other by using a bus system 140.

It should be understood that the user equipment 100 in FIG. 13 may be configured to execute the method in the embodiments of the present application, and the foregoing and other operations and/or functions of all components of the user equipment are separately for implementing corresponding processes of the methods in FIG. 12. For brevity, details are not described herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data transmission method, wherein the method comprises:

determining, by a first terminal, a frame structure in a time unit, wherein the frame structure indicates that N type-1 orthogonal frequency division multiplexing (OFDM) symbols and a guard period (GP) are comprised in the time unit, a first subcarrier spacing of each type-1 OFDM symbol is $\Delta f_1$, a first time length of the GP is greater than a second time length occupied by one type-2 OFDM symbol, a second subcarrier spacing of the type-2 OFDM symbol is $\Delta f_2$, $\Delta f_1$ is unequal to $\Delta f_2$, N is a positive integer, and N is a maximum quantity of type-1 OFDM symbols comprised in the time unit after the second time length occupied by one type-2 OFDM symbol is subtracted; and sending, by the first terminal, the N type-1 OFDM symbols according to the frame structure.

2. The method according to claim 1, wherein the GP is used to prevent the sent type-1 OFDM symbols and a type-2 OFDM symbol sent by a second terminal from overlapping on a time-frequency resource.

3. The method according to claim 1, wherein
both a third time length occupied by a cyclic prefix (CP) of each of the N type-1 OFDM symbols and a fourth time length occupied by a CP of the type-2 OFDM symbol are greater than or equal to a preset threshold.

4. The method according to claim 1, wherein when a time length of the time unit is 2 millisecond, $\Delta f_1$=3.75 kHz, and $\Delta f_2$=15 kHz,
the frame structure is a first frame structure, wherein the first frame structure comprises seven type-1 OFDM symbols and the GP.

5. The method according to claim 1, wherein when a time length of the time unit is 1 ms, $\Delta f_1$=3.75 kHz, and $\Delta f_2$=15 kHz,
the frame structure is a second frame structure, wherein the second frame structure comprises three type-1 OFDM symbols and the GP.

6. The method according to claim 5, wherein when a sampling rate is 1.92 MHz, the three type-1 OFDM symbols are respectively a symbol 0, a symbol 1, and a symbol 2, wherein
the symbol 0 comprises a first symbol sampling point part and a first CP part, a time length of the first symbol sampling point part is 512 $T_s$, a time length of the first CP part is 36 $T_s$, a time length occupied by the symbol 0 is 548 $T_s$, and a time length of $T_s$ is a time length corresponding to each sampling point at the 1.92 MHz sampling rate;
the symbol 1 comprises a second symbol sampling point part and a second CP part, a time length of the second symbol sampling point part is 512 $T_s$, a time length of the second CP part is 37 $T_s$, and a time length occupied by the symbol 1 is 549 $T_s$;
the symbol 2 is the same as the symbol 0, or the symbol 2 is the same as the symbol 1; and
the first time length of the GP is equal to a time length occupied by two type-2 OFDM symbols in a LTE system.

7. A terminal, comprising:
a processor, configured to determine a frame structure in a time unit, wherein the frame structure indicates that N type-1 OFDM symbols and a GP are comprised in the time unit, a first subcarrier spacing of each type-1 OFDM symbol is $\Delta f_1$, a first time length of the GP is greater than a second time length occupied by one type-2 OFDM symbol, a second subcarrier spacing of the type-2 OFDM symbol is $\Delta f_2$, $\Delta f_1$ is unequal to $\Delta f_2$, N is a positive integer, and N is a maximum quantity of type-1 OFDM symbols comprised in the time unit after the second time length occupied by one type-2 OFDM symbol is subtracted; and a transmitter, configured to send the N type-1 OFDM symbols according to the frame structure.

8. The terminal according to claim 7, wherein the GP is used to prevent the sent type-1 OFDM symbols and a type-2 OFDM symbol sent by a second terminal from overlapping on a time-frequency resource.

9. The terminal according to claim 7, wherein
both a third time length occupied by a cyclic prefix CP of each of the N type-1 OFDM symbol and a fourth time length occupied by a CP of the type-2 OFDM symbol are greater than or equal to a preset threshold.

10. The terminal according to claim 7, wherein the processor is specifically configured to: when a time length of the time unit is 2 ms, $\Delta f_1$=3.75 kHz, and $\Delta f_2$=15 kHz,
determine that the frame structure is a first frame structure, wherein the first frame structure comprises seven type-1 OFDM symbols and the GP.

11. The terminal according to claim 7, wherein the processor is specifically configured to: when a time length of the time unit is 1 ms, $\Delta f_1$=3.75 kHz, and $\Delta f_2$=15 kHz, determine that the frame structure is a second frame structure, wherein the second frame structure comprises three type-1 OFDM symbols and the GP.

12. The terminal according to claim 11, wherein when a sampling rate is 1.92 MHz, the three type-1 OFDM symbols are respectively a symbol 0, a symbol 1, and a symbol 2, wherein
the symbol 0 comprises a first symbol sampling point part and a first CP part, a time length of the first symbol sampling point part is 512 $T_s$, a time length of the first CP part is 36 $T_s$, a time length occupied by the symbol 0 is 548 $T_s$, and a time length of $T_s$ is a time length corresponding to each sampling point at the 1.92 MHz sampling rate;
the symbol 1 comprises a second symbol sampling point part and a second CP part, a time length of the second symbol sampling point part is 512 $T_s$, a time length of the second CP part is 37 $T_s$, and a time length occupied by the symbol 1 is 549 $T_s$;
the symbol 2 is the same as the symbol 0, or the symbol 2 is the same as the symbol 1; and
the first time length of the GP is equal to a time length occupied by two type-2 OFDM symbols in a LTE system.

13. A non-transitory computer-readable medium including computer-executable instructions that, when executed, facilitate carrying out a data transmission method comprising:
determining, by a first terminal, a frame structure in a time unit, wherein the frame structure indicates that N type-1 orthogonal frequency division multiplexing (OFDM) symbols and a guard period (GP) are comprised in the time unit, a first subcarrier spacing of each type-1 OFDM symbol is $\Delta f_1$, a first time length of the GP is greater than a second time length occupied by one type-2 OFDM symbol, a second subcarrier spacing of the type-2 OFDM symbol is $\Delta f_2$, $\Delta f_1$ is unequal to $\Delta f_2$, N is a positive integer, and N is a maximum quantity of type-1 OFDM symbols comprised in the time unit after the second time length occupied by one type-2 OFDM symbol is subtracted; and
sending, by the first terminal, the N type-1 OFDM symbols according to the frame structure.

14. The non-transitory computer-readable medium according to claim 13, wherein the GP is used to prevent the sent type-1 OFDM symbols and a type-2 OFDM symbol sent by a second terminal from overlapping on a time-frequency resource.

15. The non-transitory computer readable medium of claim 13, wherein
both a third time length occupied by a cyclic prefix (CP) of each of the N type-1 OFDM symbols and a fourth time length occupied by a CP of the type-2 OFDM symbol are greater than or equal to a preset threshold.

16. The non-transitory computer readable medium of claim 13, wherein when a time length of the time unit is 2 millisecond, $\Delta f_1$=3.75 kHz, and $\Delta f_2$=15 kHz,
the frame structure is a first frame structure, wherein the first frame structure comprises seven type-1 OFDM symbols and the GP.

17. The non-transitory computer readable medium of claim 13, wherein when a time length of the time unit is 1 ms, $\Delta f_1$=3.75 kHz, and $\Delta f_2$=15 kHz,
the frame structure is a second frame structure, wherein the second frame structure comprises three type-1 OFDM symbols and the GP.

18. The non-transitory computer readable medium of claim 17, wherein when a sampling rate is 1.92 MHz, the three type-1 OFDM symbols are respectively a symbol 0, a symbol 1, and a symbol 2, wherein
the symbol 0 comprises a first symbol sampling point part and a first CP part, a time length of the first symbol sampling point part is 512 $T_s$, a time length of the first CP part is 36 $T_s$, a time length occupied by the symbol 0 is 548 $T_s$, and a time length of $T_s$ is a time length corresponding to each sampling point at the 1.92 MHz sampling rate;
the symbol 1 comprises a second symbol sampling point part and a second CP part, a time length of the second symbol sampling point part is 512 $T_s$, a time length of the second CP part is 37 $T_s$, and a time length occupied by the symbol 1 is 549 $T_s$;
the symbol 2 is the same as the symbol 0, or the symbol 2 is the same as the symbol 1; and
the first time length of the GP is equal to a time length occupied by two type-2 OFDM symbols in a LTE system.

* * * * *